US012222272B2

(12) United States Patent
Kempema et al.

(10) Patent No.: US 12,222,272 B2
(45) Date of Patent: Feb. 11, 2025

(54) METHOD AND SYSTEMS FOR OPTICALLY SENSING PARTICULATE MATTER

(71) Applicant: Ford Global Technologies, LLC, Dearborn, MI (US)

(72) Inventors: Nathan Kempema, Grosse Pointe Farms, MI (US); David Bilby, Royal Oak, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 327 days.

(21) Appl. No.: 17/653,447

(22) Filed: Mar. 3, 2022

(65) Prior Publication Data
US 2023/0280258 A1    Sep. 7, 2023

(51) Int. Cl.
*G01N 15/06*    (2024.01)
*G01M 15/10*    (2006.01)
*G01N 15/075*    (2024.01)

(52) U.S. Cl.
CPC ...... *G01N 15/0618* (2013.01); *G01M 15/108* (2013.01); *G01N 15/075* (2024.01)

(58) Field of Classification Search
CPC ........ G01N 33/49; G01N 21/05; G01N 21/25; G01N 21/552; G01N 15/0618; G01N 2015/0693; B01L 3/502; B01L 2300/168; G01M 15/108
USPC .......... 356/335–343, 440–432, 73, 445–448, 356/237.1–237.5
See application file for complete search history.

(56) References Cited

U.S. PATENT DOCUMENTS

| 4,818,710 | A | * | 4/1989 | Sutherland | ........... G01N 21/648 436/805 |
| 5,592,296 | A |   | 1/1997 | Pye | |
| 2003/0052257 | A1 | * | 3/2003 | Sumriddetchkajorn | .................... H03K 17/9638 250/227.11 |
| 2005/0048599 | A1 | * | 3/2005 | Goldberg | ............. G01N 33/561 435/287.1 |
| 2006/0017895 | A1 | * | 1/2006 | Sogard | ................ G03F 7/70875 355/75 |

(Continued)

FOREIGN PATENT DOCUMENTS

| DE | 102010019076 A1 | 11/2011 |
| JP | 2004530123 A  *  | 9/2004 |
| WO | 2005024400 A1 | 3/2005 |

OTHER PUBLICATIONS

Fischerauer, G. et al., "Sensing the soot load in automotive diesel particulate filters by microwave methods", Measurement Science and Technology, vol. 21, No. 3, Feb. 9, 2010, 7 pages.

(Continued)

*Primary Examiner* — Hoa Q Pham
(74) *Attorney, Agent, or Firm* — Vincent Mastrogiacomo; McCoy Russell LLP

(57) ABSTRACT

Methods and systems are provided for a particulate matter sensor. In one example, the particulate matter sensor may include a light source, a waveguide aligned with the light source to receive incident light from the light source, and a photodetector positioned to receive light the incident light from the waveguide. The incident light may be reflected off a reflective surface of the waveguide more than one time to generate a plurality of evanescent waves. The plurality of evanescent waves may interact with particulate matter in exhaust gas, causing the incident light to be attenuated.

11 Claims, 14 Drawing Sheets

(56) References Cited

U.S. PATENT DOCUMENTS

| | | | | |
|---|---|---|---|---|
| 2010/0123900 | A1* | 5/2010 | Chau | G01N 21/554 |
| | | | | 977/810 |
| 2010/0197038 | A1* | 8/2010 | Verschuren | G01N 21/552 |
| | | | | 436/164 |
| 2012/0170023 | A1* | 7/2012 | Szobota | G01N 21/552 |
| | | | | 356/51 |
| 2013/0050706 | A1* | 2/2013 | Koulikov | G01N 21/39 |
| | | | | 356/437 |
| 2019/0234931 | A1* | 8/2019 | Schonbrun | G01N 21/0303 |

OTHER PUBLICATIONS

Tong, Z. et al. "Miniaturized PM2.5 Particulate Sensor Based on Optical Sensing," Proceedings of the Northeast Section Conference of the American Society for Engineering Education, Apr. 30, 2015, Boston, MA., 1 page.

Fathihah, M. et al., "Development of low-cost and user-friendly sustainable portable particulate sensor," IOP Conference Series Materials Science and Engineering, vol. 458, No. 1, Dec. 2018, 10 pages.

Buchberger, A. et al., "Integrated evanescent field detector for ultrafine particles—theory and concept," Optics Express, vol. 28, No. 14, Jul. 6, 2020, 14 pages.

* cited by examiner

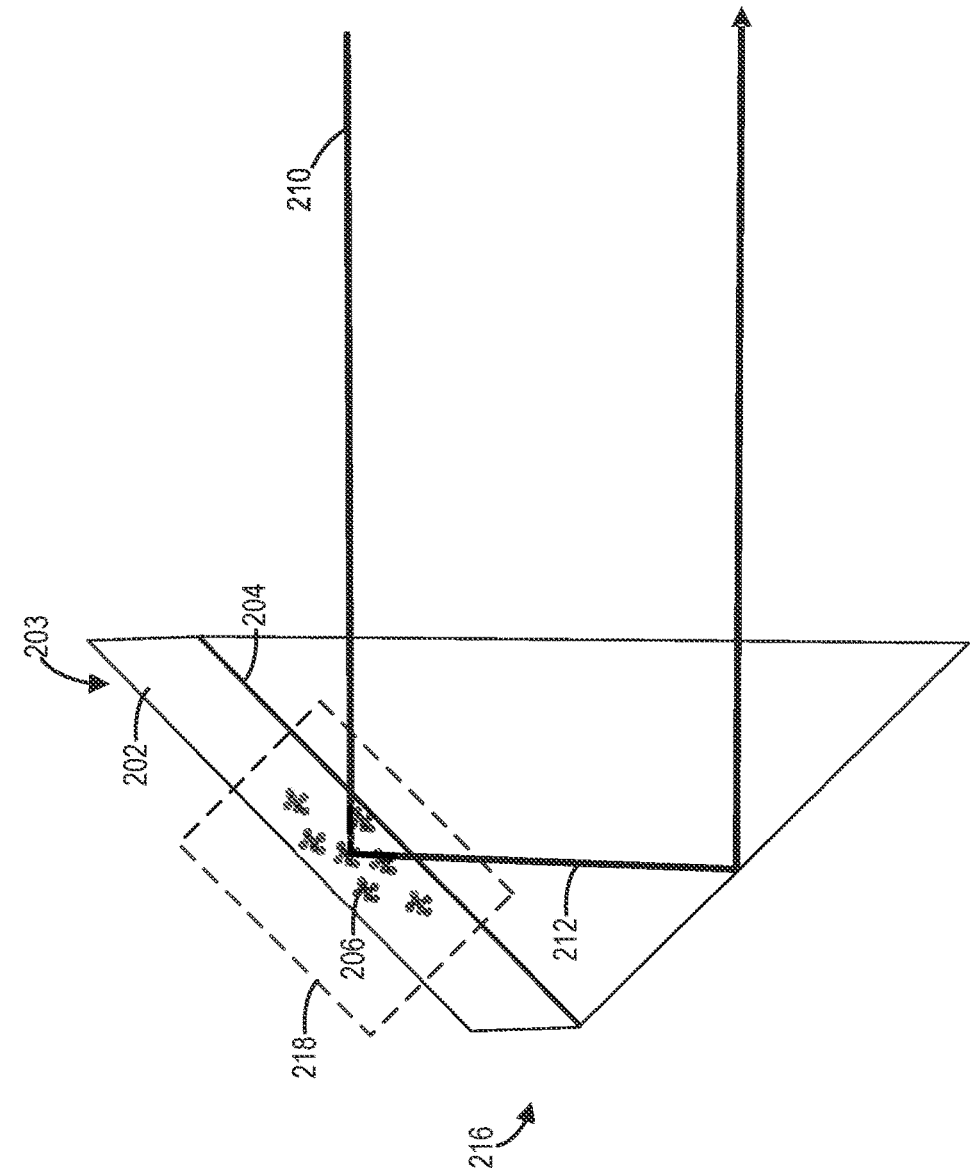

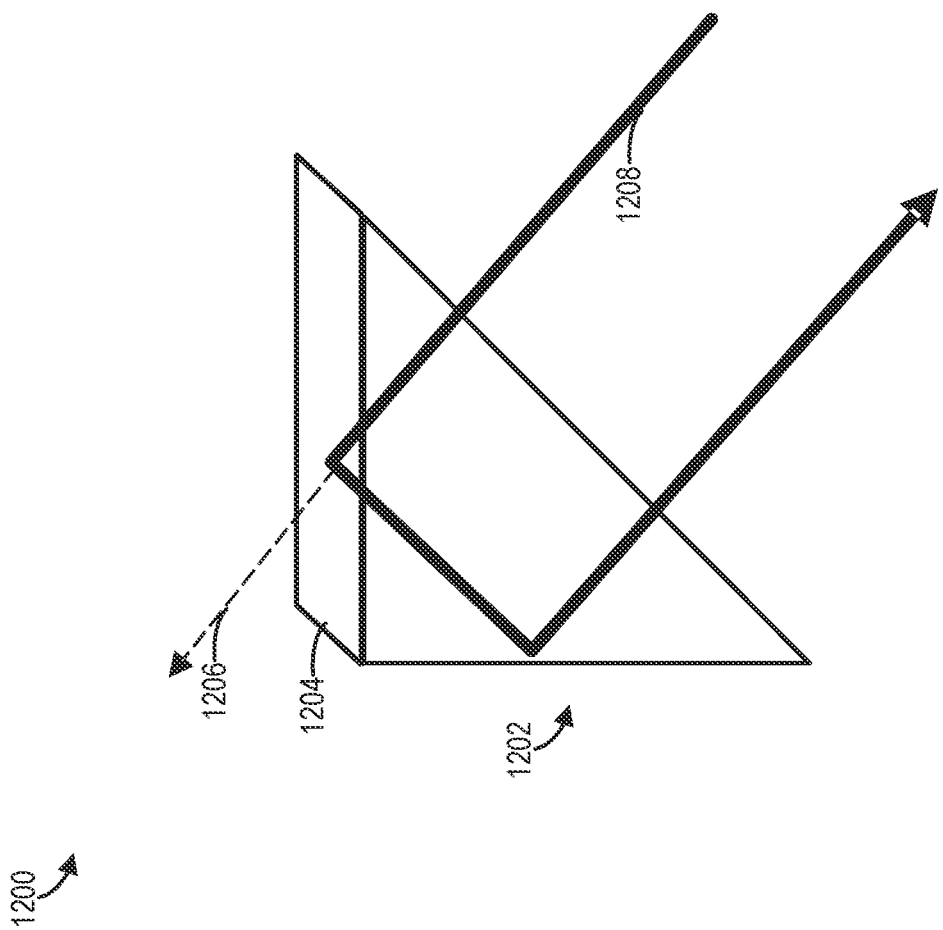

METHOD AND SYSTEMS FOR OPTICALLY SENSING PARTICULATE MATTER

FIELD

The present description relates generally to methods and systems for optically sensing particulate matter in vehicle emissions.

BACKGROUND/SUMMARY

Diesel combustion may generate emissions, including particulate matter (PM). The particulate matter may include diesel soot and aerosols such as ash particulates, metallic abrasion particles, sulfates, and silicates. When released into the atmosphere, the PM can take the form of individual particles or chain aggregates, with most in the invisible sub-micrometer range of 100 nanometers. Various technologies have been developed for identifying and filtering out exhaust PMs before the exhaust is released to the atmosphere.

As an example, PM or soot sensors may be used in vehicles having internal combustion engines. A PM sensor may be located upstream and/or downstream of a diesel particulate filter (DPF), and may be used to sense PM loading on the DPF and diagnose operation of the DPF. Conventionally, PM sensors may be resistive sensors including planar interdigitated electrodes that sense a PM or soot load based on a correlation between a measured change in electrical conductivity between a pair of electrodes and the amount of PM deposited between the measuring electrodes. A response time of resistive PM sensors may be limited by an amount of time required to accumulate enough deposited particulates to meet a detection limit of the PM sensors. In order to improve DPF monitoring, a PM sensor that can measure at least 14 mg of soot per mile is desired. Additionally, a target rate of DPF diagnosis may include completing the diagnosis 0.336 times per drive cycle (i.e., 1 diagnosis over approximately 3 drive cycles).

Other attempts to address the speed and sensitivity of PM sensors include the use of optical sensors. One example approach is shown by Schittenhelm in WO2005024400A1. Therein, an optical sensor for measuring soot in exhaust gas is described. The optical sensor may include a light source, light guide, and photodetector. The outer surface of the light guide may be exposed to exhaust gas resulting in formation of a layer of soot at the surface. The light source may be directed through the interior of the light guide, reflected from an inner surface and collected by the photodetector. The amount of light reaching the photodetector is dependent on the amount of soot collected at the outer surface of the light guide. In other words, the difference in intensity between a light source going into the light guide and the light exiting the light guide is proportional to the concentration of soot at the surface.

However, the inventors herein have recognized potential issues with such systems. As one example, the intensity change due to a single interaction between the light source and surface of the light guide may be associated with a relatively long response time of the detector. For example, relying on natural diffusion to deposit soot particles at the light guide surface may require a minimum amount of time before soot accumulation is high enough to reach a detection limit of the sensor.

In one example, the issues described above may be addressed by a particulate matter sensor having a light source, a waveguide aligned with the light source to receive incident light from the light source and reflect the incident light off a first reflective surface of the waveguide more than one time to generate a plurality of evanescent waves, and a photodetector positioned to receive the incident light from the waveguide. By increasing the number of times the incident light interacts with the top surface of the waveguide, an optical signal corresponding to a concentration of particulate matter may be more responsive to low soot concentrations. In this way, a concentration of particulate matter in exhaust gas may be measured quickly and a DPF may be monitored more robustly.

As one example, the particulate matter sensor may incorporate reflective surfaces to increase the interaction between the incident light and the first reflective surface of the waveguide. Further, the particulate matter may be actively driven to the first reflective surface to encourage accumulation and thus increase a response speed of the sensor. A decay profile over time may be used to estimate the particulate matter concentration in exhaust gas.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIG. 2A shows a representation of a basic operating principle for an optical PM sensor according to an embodiment of the disclosure.

FIG. 12 shows an example of an optical PM sensor, including with an engineered refractive index coating, according to an embodiment of the disclosure.

DETAILED DESCRIPTION

Figure 1:
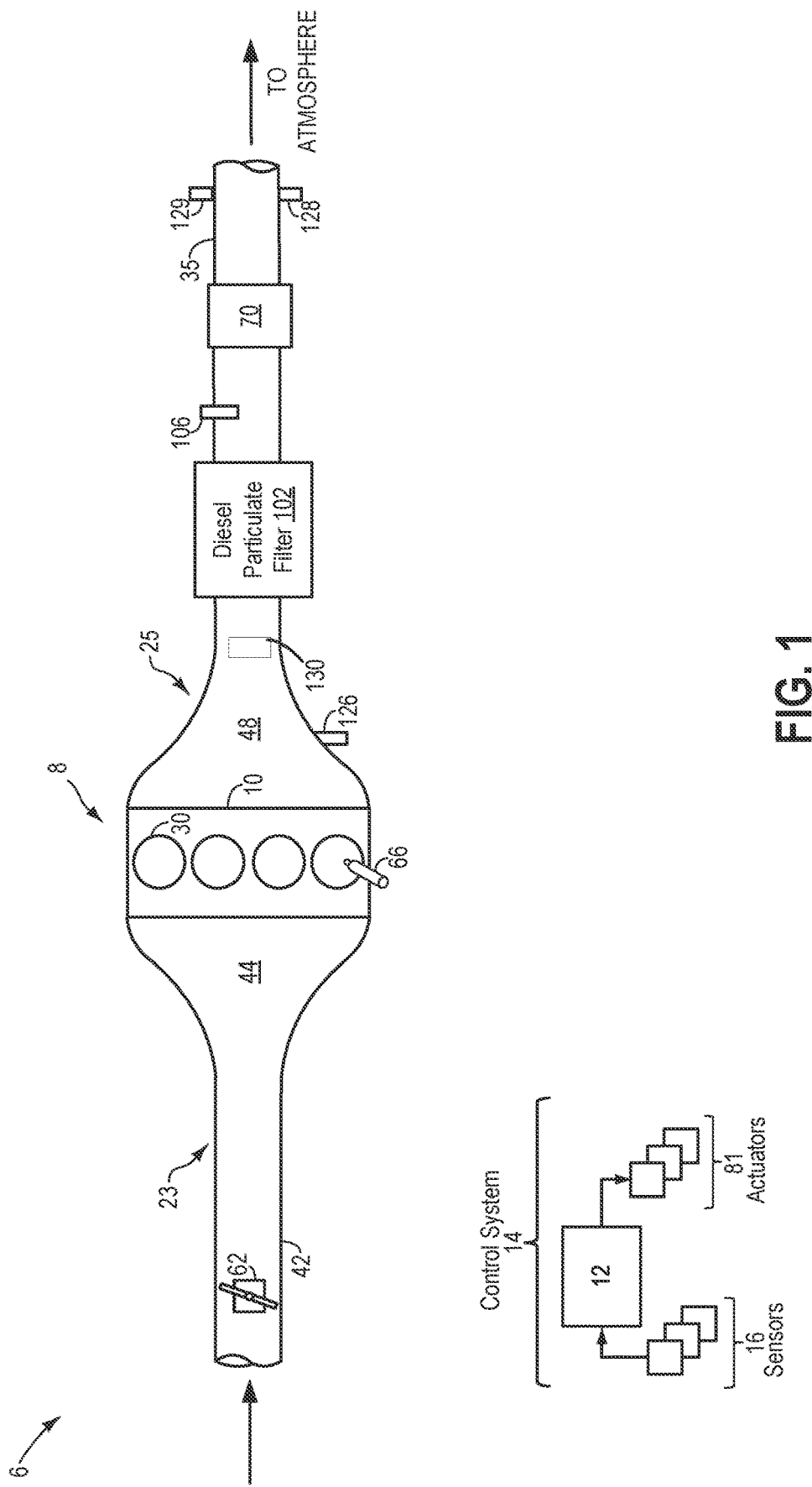
FIG. 1 shows a schematic diagram of an engine and an optical particulate matter (PM) sensor positioned in an exhaust flow of the engine, according to an embodiment of the disclosure.
Figure 2B:
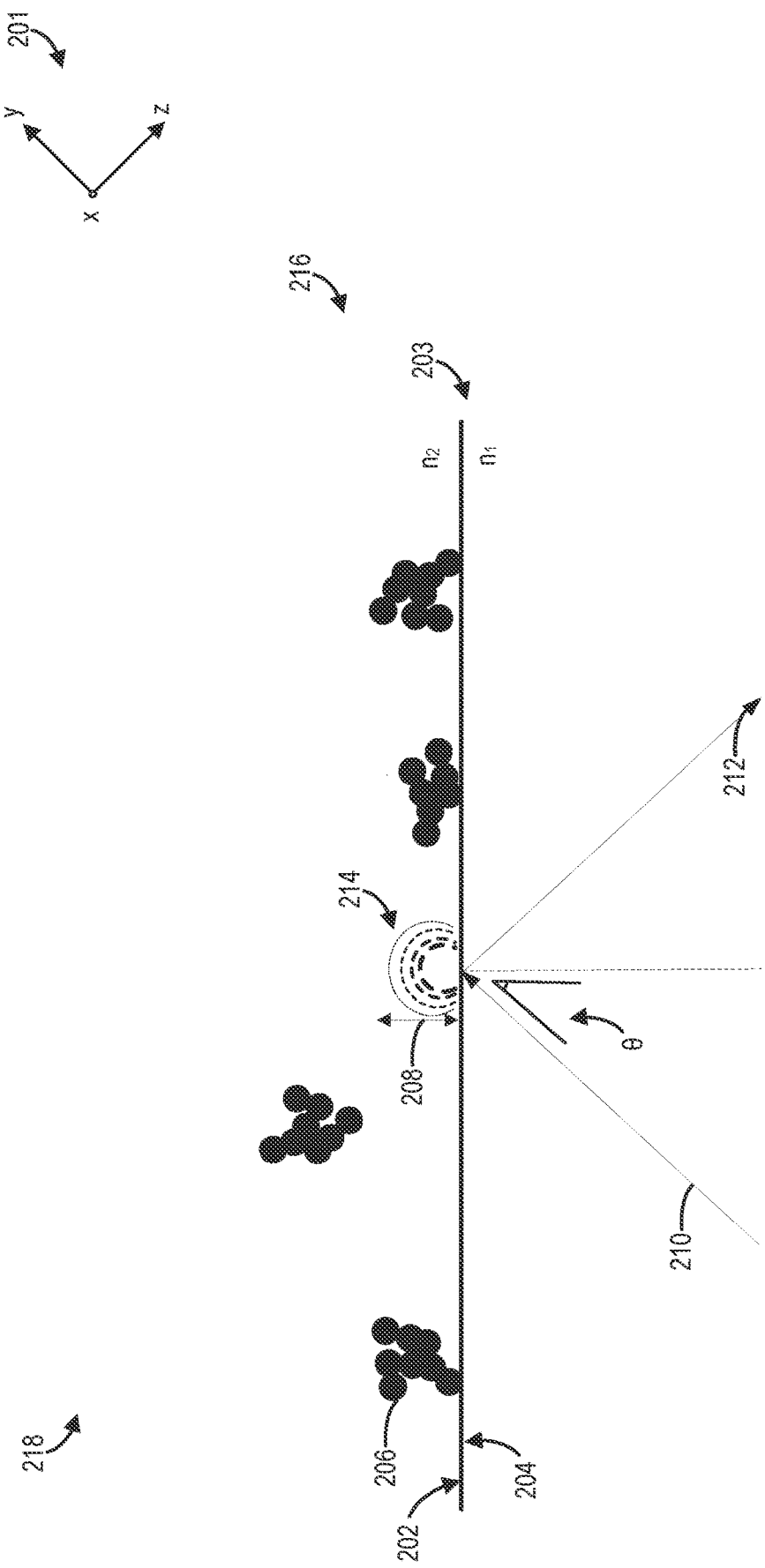
FIG. 2B shows a detailed view of a region of the optical PM sensor of FIG. 2A.
Figure 3:
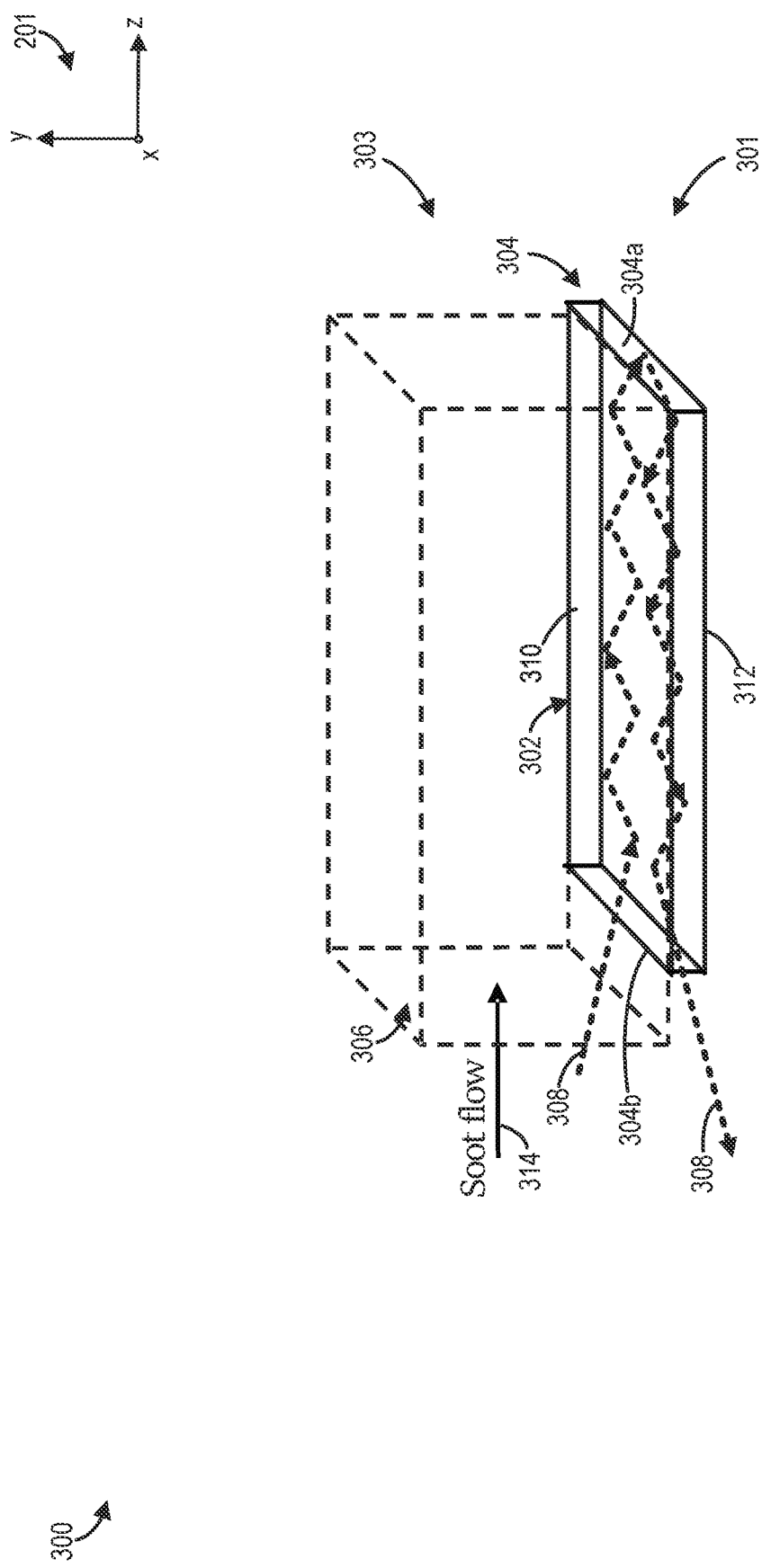
FIG. 3 shows an example of an intensity calibrated PM sensor, according to an embodiment of the disclosure.
Figure 6:
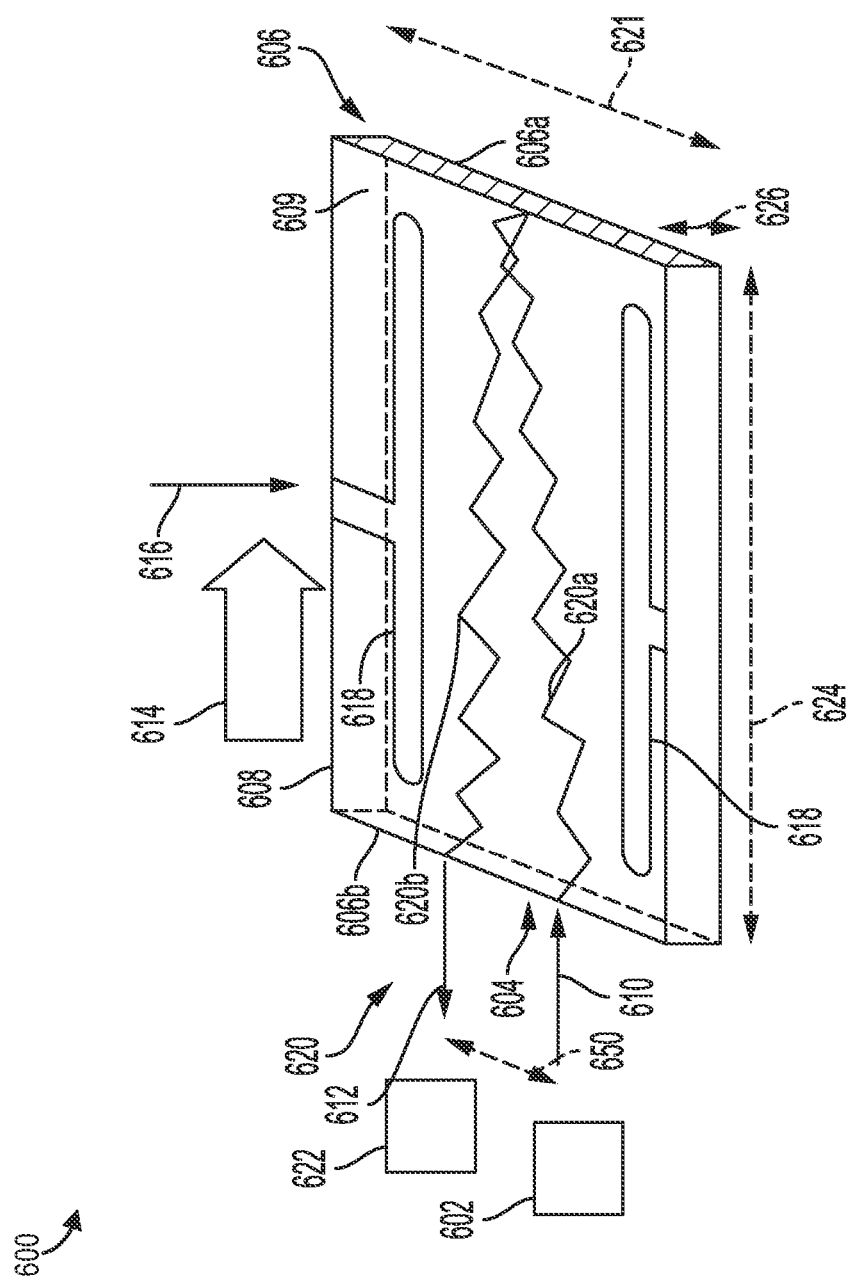
FIG. 6 shows an example of an intensity calibrated optical PM sensor with increased sensitivity, according to an embodiment of the disclosure.
Figure 7A:
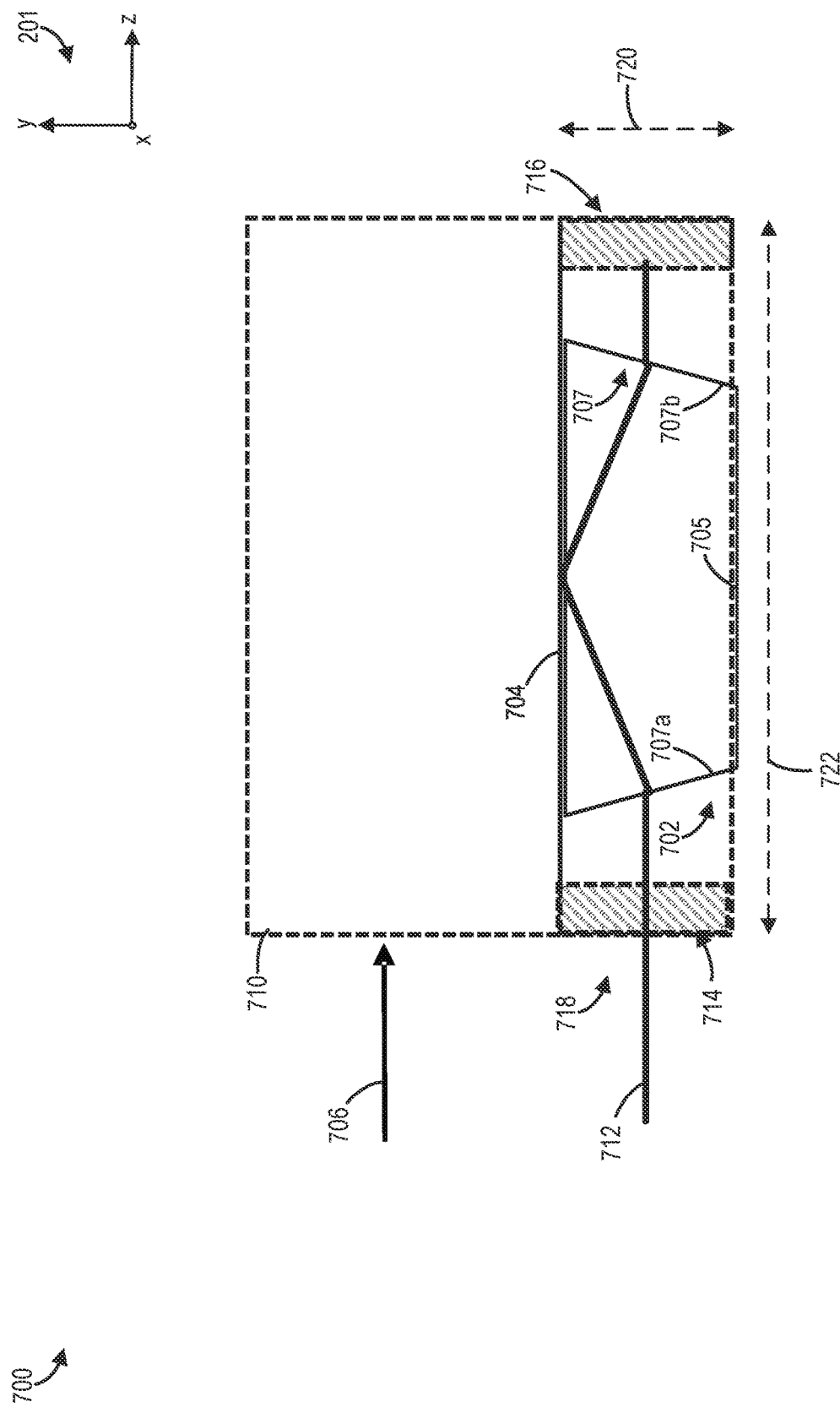
FIG. 7A shows an example of an optical PM sensor including a reflective cavity, according to an embodiment of the disclosure.
Figure 7B:
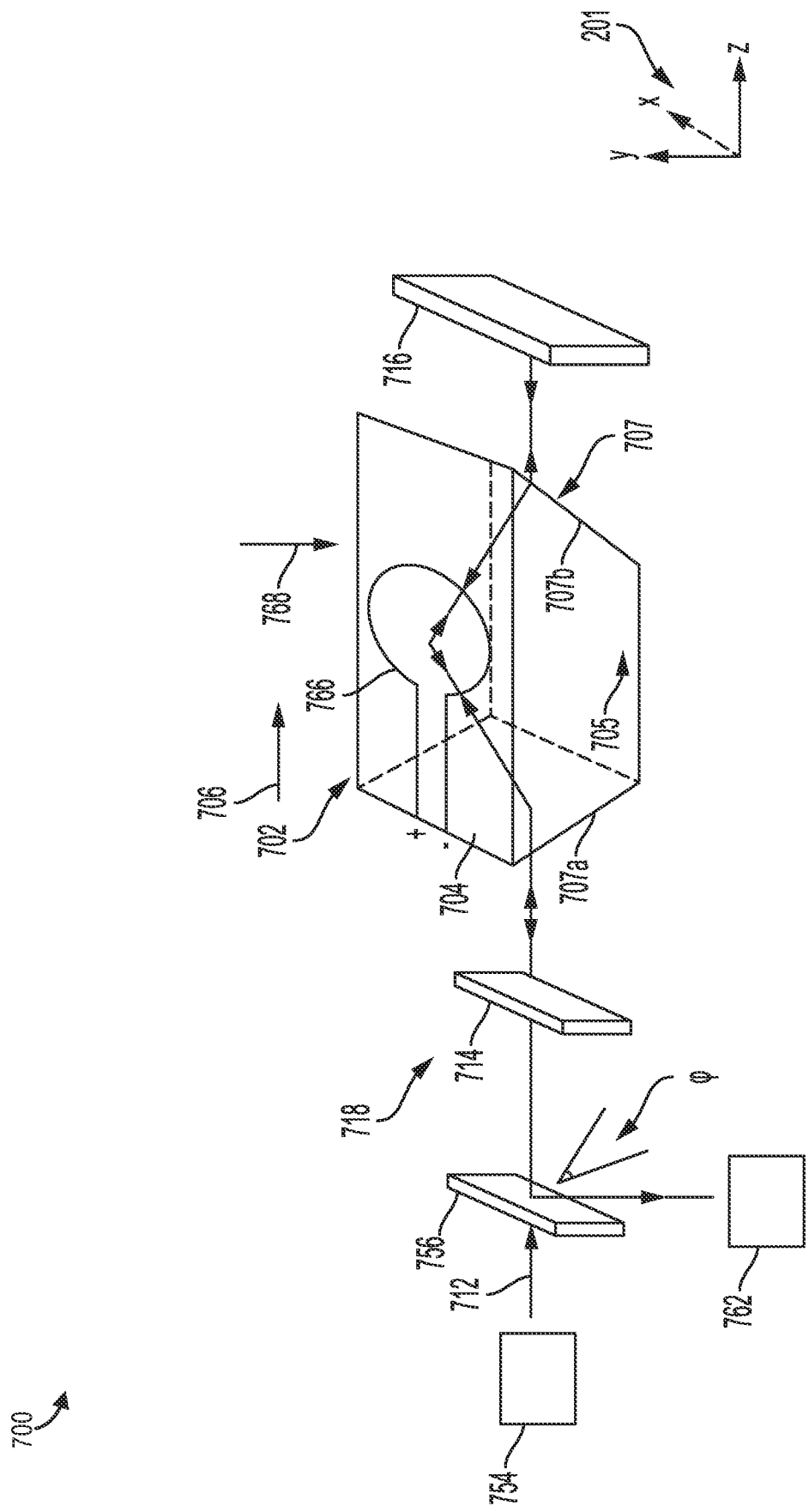
FIG. 7B shows an example of the PM sensor of FIG. 7A adapted with a pulsed light source.
Figure 8:
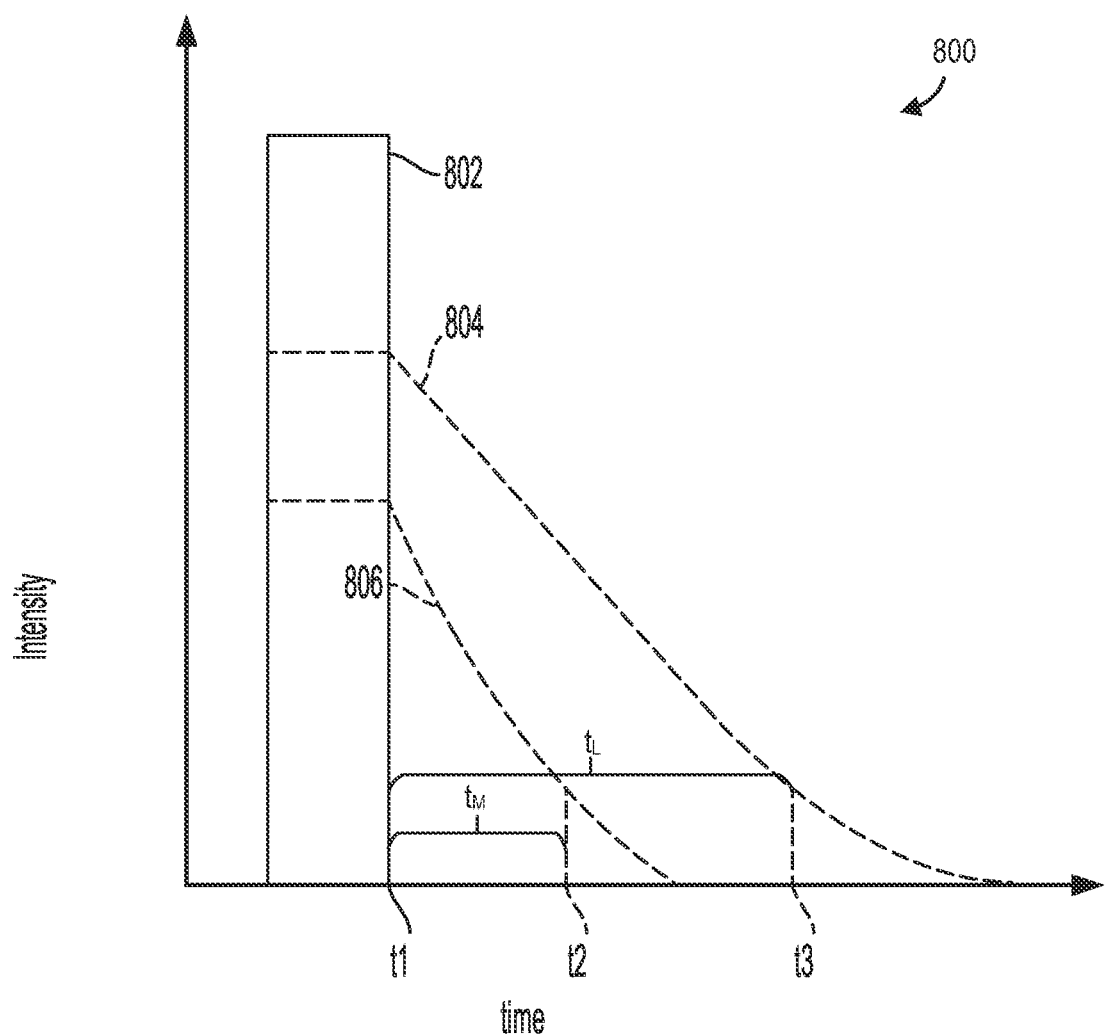
FIG. 8 shows a graph illustrating photon intensity versus time collected from a decay calibrated PM sensor.
Figure 10:
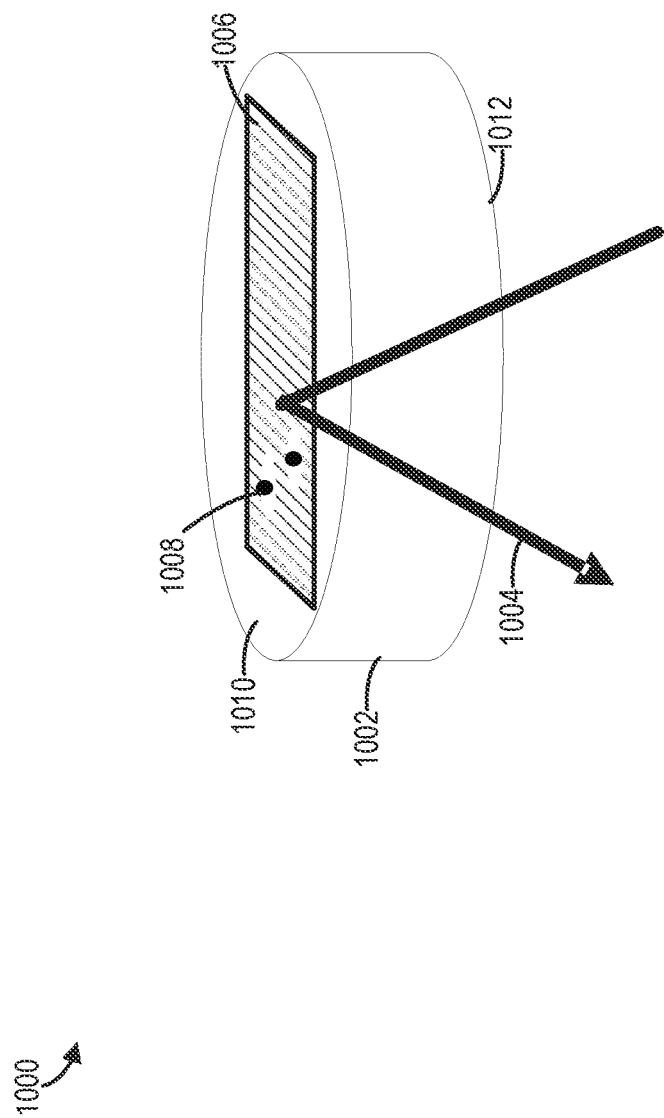
FIG. 10 shows an example of an optical PM sensor, including a photoluminescent doped oxide film, according to an embodiment of the disclosure.
Figure 11:
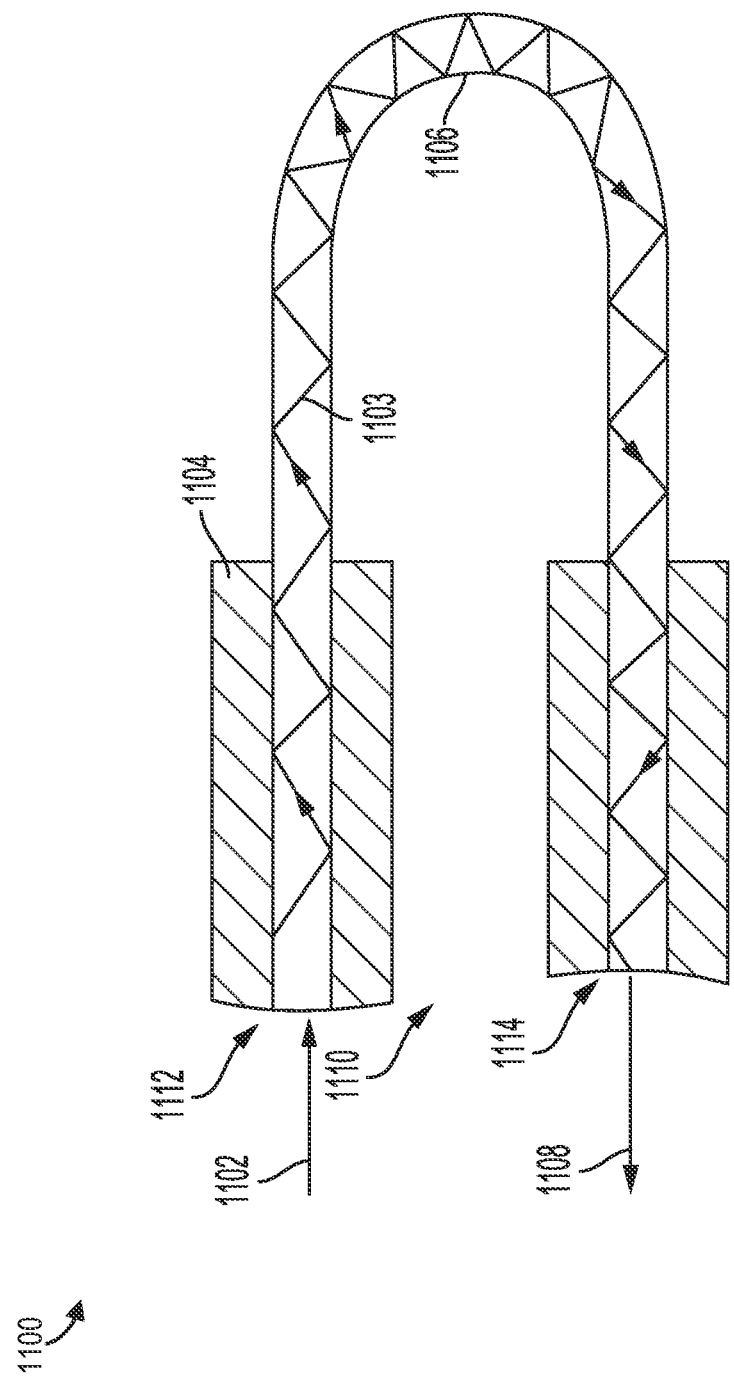
FIG. 11 shows an example of an optical PM sensor, including a fiber optic waveguide, according to an embodiment of the disclosure.

The following description relates to systems and methods for measuring the amount of particulate matter (PM) stored on an engine exhaust particulate filter, such as the vehicle system of FIG. 1. An optical PM sensor may detect soot particles by propagating light through a waveguide and generating an evanescent wave at a surface of the sensor, as depicted in FIGS. 2A-B. A number of interactions between light and the waveguide surface may be increased by strategic use of reflective surfaces, as shown in FIG. 3. Electrophoresis and thermophoresis may be used to further enhance a response rate of the optical PM sensor, as detailed in FIGS. 4A-4B. A sensitivity of an optical PM device using electrophoresis is demonstrated by experimental results plotted in FIG. 5. By combining concepts illustrated in FIGS. 2A-4B, an optical PM sensor may be configured as illustrated in FIG. 6 which may include reflective surfaces, active soot attraction, and a resistive element for cleaning the waveguide surfaces. An alternate embodiment of an optical PM sensor is shown in FIG. 7A-B which includes reflective surfaces positioned such that the soot concentration may be proportional to a decay profile of pulsed light. Examples of possible decay profiles measured at different soot concentrations on the surface of the optical PM sensor of FIG. 7A-B are shown in FIG. 8. A controller may be configured to perform a control routine, such as an example routine of FIG. 9, to determine particulate concentration. FIGS. 10-12 show additional alternate embodiments of an optical PM sensor.

FIG. 1 shows a schematic depiction of a vehicle system 6. The vehicle system 6 includes an engine system 8. The engine system 8 may include an engine 10 having a plurality of cylinders 30. Engine 10 includes an engine intake 23 and an engine exhaust 25. Engine intake 23 includes a throttle 62 fluidly coupled to the engine intake manifold 44 via an intake passage 42. The engine exhaust 25 includes an exhaust manifold 48 eventually leading to an exhaust passage 35 that routes exhaust gas to the atmosphere. Throttle 62 may be located in intake passage 42 downstream of a boosting device, such as a turbocharger (not shown), and upstream of an after-cooler (not shown). When included, the after-cooler may be configured to reduce the temperature of intake air compressed by the boosting device.

Engine exhaust 25 may include one or more emission control devices 70, which may be mounted in a close-coupled position in the exhaust. The one or more emission control devices may include a three-way catalyst, lean NOx filter, SCR catalyst, etc. Engine exhaust 25 may also include diesel particulate filter (DPF) 102, which filters PMs from a diesel exhaust gas stream, where DPF 102 is positioned upstream of the one or more emission control devices 70. In one example, as depicted, DPF 102 is a diesel particulate matter retaining system. DPF 102 may have a monolith structure formed of, for example, cordierite or silicon carbide, with a plurality of channels inside for filtering PM from diesel exhaust gas. Exhaust gas that has been filtered of PM, following passage through DPF 102, may be measured at a PM sensor 106 and further processed by the one or more emission control devices 70 before being expelled to the atmosphere via exhaust passage 35. In the depicted example, PM sensor 106 may be an optical sensor that estimates a filtering efficiency of DPF 102 based on rate of change intensity of a light entering and exiting a waveguide of the optical PM sensor 106. The light entering the waveguide may be reflected, generating an evanescent field or wave at the surface of the waveguide. The evanescent wave may interact with soot particles at the waveguide surface and the reflected light may become attenuated through scattering, refraction and/or absorption. A schematic view of an embodiment of the optical PM sensor is shown at FIG. 6, and described in further detail below.

The vehicle system 6 may further include control system 14. Control system 14 is shown receiving information from a plurality of sensors 16 (various examples of which are described herein) and sending control signals to a plurality of actuators 81 (various examples of which are described herein). As one example, sensors 16 may include exhaust flow rate sensor 126 configured to measure a flow rate of exhaust gas through the exhaust passage 35, exhaust gas sensor 130 (located in exhaust manifold 48) configured to infer an engine air/fuel ratio (for example, a universal exhaust gas oxygen (UEGO) sensor), temperature sensor 128, pressure sensor 129 (located downstream of emission control device 70), and PM sensor 106. Other sensors, such as additional pressure, temperature, air/fuel ratio, exhaust flow rate and composition sensors, may be coupled to various locations in the vehicle system 6. As another example, the actuators may include fuel injectors 66, throttle 62, DPF valves that control filter regeneration (not shown), a resistive heater (not shown) coupled to PM sensor 106, switches of electric circuits, etc. The control system 14 may include a controller 12. The controller 12 may be configured with computer readable instructions stored on non-transitory memory. The controller 12 receives signals from the various sensors of FIG. 1, processes the signals, and employs the various actuators of FIG. 1 to adjust engine operation based on the received signals and instructions stored on a memory of the controller. For example, an optical signal may drop below a threshold indicating an excess of soot accumulation at the optical PM sensor, in response the controller may command regeneration by actuating resistive heating elements coupled to the optical PM sensor to heat the sensor and burn off soot particles deposited on the optical PM sensor surface. Example routines are described herein with reference to FIG. 9.

In conventional systems, PM sensor 106 of FIG. 1 may be a resistive PM sensor. The resistive PM sensor relies on accumulation of soot to bridge interdigitated electrodes. When soot is able to bridge the interdigitated electrodes, a resistance of the interdigitated electrodes decreases in proportion to an amount of soot collected. However, there may be a response lag between when the resistive PM sensor is clean, e.g., prior to soot accumulation, and when enough soot has accumulated to bridge the interdigitated electrodes, thereby resulting in a slow response rate of the resistive PM sensor. In contrast, the optical PM sensor of the present disclosure may respond to soot accumulation at a lower concentration of soot. As a result, a response of the optical PM sensor may be provided without a lag time, allowing a DPF to be reliably and efficiently monitored. The optical PM sensor may rely on the interaction between an evanescent wave generated at the surface of a waveguide and soot particles, as described below with respect to FIGS. 2A-2B.

Turning now to FIG. 2A, a diagram of a portion of an optical sensor 200 illustrating detection of soot particles 206 based on reflection of light at waveguide 216 is shown. The optical sensor 200 shows non-limiting examples of components that may be included in an optical PM sensor for a vehicle, such as PM sensor 106 of FIG. 1. The optical sensor 200 may also include a photodetector (not shown) configured to receive reflected light and a light source (not shown). A set of reference axes 201 are provided for comparison between views shown, including a y-axis, an x-axis, and a z-axis. In one example, as shown in FIG. 2A, waveguide 216 may be a triangular prism, e.g., waveguide 216 has a triangular geometry along the y-z plane. However, other waveguide shapes are possible, such as rectangular or trapezoidal prisms, as discussed further below. Waveguide 216 may be formed of a high-temperature tolerant material that is transparent to a wavelength or wavelengths of incoming light 210 (e.g., a beam of light) emitted from a light source. For example, waveguide 216 may be formed of one of: quartz, sapphire, or silicon carbide.

Soot particles 206 may be collected at outer surface 202 of a first surface or side 203 of waveguide 216. Incoming light 210, e.g., incident light, may be emitted from a coherent or disperse light source, such as a light-emitting diode (LED), a heated element, a laser element, etc., and may be directed to inner surface (e.g., inner face) 204 of the first side 203 of waveguide 216 to undergo total internal reflection at inner surface 204. The total internal reflection may generate an evanescent wave at outer surface (e.g., outer face) 202, which may interact with soot particles 206. Incoming light 210 may be reflected one or more times before exiting waveguide 216 as outgoing light 212. The generation of the evanescent wave at a region 218, as indicated by a dashed rectangle, of waveguide 216 is shown in greater detail in FIG. 2B.

Turning now to FIG. 2B, the region 218 of FIG. 2A of the first side 203 of waveguide 216 is shown in greater detail. A material of the waveguide may be selected such that the inner surface 204 has an index of refraction ($n_1$) that is greater the index of refraction ($n_2$) at the outer surface 202 (e.g. of air). As such, incoming light 210 propagating at an angle theta ($\theta$), which is greater than a critical angle (i.e., a minimum angle for total internal reflection characteristic of an interface between indices of refraction $n_1$ and $n_2$) may generate an exponentially decaying evanescent wave 214 of depth 208 at outer surface 202. The evanescent wave 214 is an oscillating electric and/or magnetic field with energy spatially concentrated proximate to a source of the evanescent wave, e.g., a point where incoming light 210 interacts with waveguide 216. As such, the evanescent wave 214 does not propagate as an electromagnetic wave and instead may decay exponentially. Incoming light 210 may undergo total internal reflection to be reflected as outgoing light 212.

When outer surface 202 is clean, the evanescent wave 214 may decay and the total internal reflection of incoming light 210 may result in an intensity (i.e., number of photons) of outgoing light 212 equaling that of incoming light 210. When outer surface 202 is exposed to soot, however, soot particles 206 may adhere to outer surface 202 of waveguide 216. If soot particles 206 interact with evanescent wave 214, some light may be absorbed or scattered and not reflected as outgoing light 212. Additionally or alternatively, soot particles 206 may alter $n_2$ such that $n_2$ is greater than $n_1$, resulting in incoming light 210 being refracted instead of reflected as outgoing light 212. In both cases, the intensity of incoming light 210 is greater than that of outgoing light 212.

A difference in intensity between incoming light 210 and outgoing light 212 may be proportional to an amount of soot at outer surface 202. The higher the concentration of soot in the exhaust gas passing over outer surface 202, the faster the intensity difference may increase. An absolute concentration of soot in exhaust gas may be known by calibrating a rate of decrease in the intensity of outgoing light 212 against controlled exhaust flows with known concentrations. Increasing the number of total internal reflections off of outer surface 202 that may occur between light entering and exiting waveguide 216 may enhance the sensitivity of the optical PM sensor. As one strategy, exemplified by waveguide 302 of FIG. 3, the total internal reflections may be increased by incorporating a reflective sidewall into a waveguide.

Turning now to FIG. 3, an example of an optical PM sensor 300 is shown having a light-directing portion 301 and an exhaust gas-receiving portion 303. The optical PM sensor 300 shows non-limiting examples of components that may be included in an optical PM sensor for a vehicle, such as PM sensor 106 of FIG. 1. The light-directing portion 301 includes a rectangular prism waveguide 302, which has a rectangular geometry along the y-x plane and the y-z plane, with a reflective surface. It will be appreciated that the light-directing portion 301 of the optical PM sensor 300 may include additional components that are not depicted in FIG. 3 for brevity, including a light source, a photodetector, a housing, etc. For example, the optical PM sensor 300 may be enclosed within a housing shaped to produce a venturi effect, thereby drawing exhaust gas into the exhaust gas-receiving portion 303 of the optical PM sensor 300 based on a pressure differential. In one example, the housing may be a cylindrical metal tube, such as a venturi-style tube which encloses a portion of waveguide 302 which interacts with the exhaust gas, e.g., components shown in FIGS. 2A, 3, 4A, 4B, 7A, 7B, and 10-12. Additional components of optical PM sensor 300, such as a light source and photodetector, which are shown in FIGS. 6 and 7B, as well as other components for directing light to and from waveguide 302, may be heat-sensitive and thus positioned outside of the venturi-style tube and away from the hot exhaust gas. The heat-sensitive components of the optical PM sensor 300 housed within the venturi-style tube may be positioned as far away as possible from exhaust gas, such as at a far end of the venturi-style tube, and may incorporate heat sinks for temperature management. Additionally or alternatively, the heat-sensitive components may be mounted remotely and coupled to the optical PM sensor 300 by optical fibers.

Waveguide 302 has top face 310, bottom face 312, and four sidewalls 304, including reflective sidewall 304a. Top face 310 may be an internally reflective surface of waveguide 302 configured to provide total internal reflection of light travelling through waveguide 302. Reflective sidewall 304a may be positioned opposite an entry sidewall 304b of the four sidewalls 304 through which light 308 enters and exits waveguide 302. The exhaust gas-receiving portion is configured as chamber 306, as indicated in dashed lines, which may be positioned directly above waveguide 302 to receive exhaust flow from an exhaust manifold. For example, chamber 306 may represent an inner volume of the housing of the optical PM sensor 300. Chamber 306 may also be shaped as a rectangular prism including a top face, bottom face, and four sidewalls. However, the depiction of chamber 306 as the rectangular prism is a non-limiting example, and chamber 306 may have a different geometry in other examples, such as cylindrical. Chamber 306 may be coupled to waveguide 302 such that the bottom face of chamber 306 forms top face 310 of waveguide 302.

Exhaust gas containing soot may pass through chamber 306 over top face 310 of waveguide 302 flowing in the direction of arrow 314. Soot particles of the exhaust gas may be deposited onto top face 310. Light 308 may enter waveguide 302 through the entry sidewall 304b opposite reflective sidewall 304a, propagating via total internal reflection in a direction parallel to the direction of soot flow. In other examples, reflective sidewall 304a may instead be arranged as one of the four sidewalls 304 arranged perpendicular to the direction of soot flow. Propagating light 308 may reflect multiple times off of top face 310, e.g., more than one time, and bottom face 312 in an alternating manner while traveling in the direction of arrow 314. At each reflection off of top face 310, an evanescent wave may be scattered, absorbed, or refracted by soot particles deposited on an outer surface of top face 310, as described with reference to FIG. 2B above. Propagating light 308 may reach reflective sidewall 304a, at which point the reflective coating may re-direct the light to propagate by total internal reflection in an opposite direction, continuing to reflect off of top face 310 and bottom face 312 before exiting the waveguide 302 at the entry sidewall 304b. In some examples, reflective sidewall 304a may be rendered reflective via a high melting temperature, inert, metallic coating that is compatible with a wavelength of propagating light 308, such as silver or gold. In another example, reflective sidewall 304a may be rendered reflective via layers of varying refractive index materials, such as Bragg reflectors.

In this way, reflective sidewall 304a may increase the number of times light 308 reflects off of top face 310, effectively enhancing a sensitivity of an optical PM sensor receiving light 308. In other words, a signal strength of the optical PM sensor may be given by a rate of decrease of light intensity exiting the waveguide. For a given amount of soot at top face 310, the signal strength may be greater when the number of times light 308 reflects off of top face 310 is increased. For example, by reflecting propagating light off reflective sidewall 304a, propagating light may interact with top face 310 at least twice as many times as when reflective sidewall 304a is not reflective, there increasing the signal strength by at least two times. Additionally, adjusting dimensions of the waveguide 302 may modify a number of interactions, e.g., internal reflections, of propagating light with top face 310. As an example, by decreasing a thickness of the waveguide 302, the thickness defined along the y-axis, the number of interactions may be increased.

Figure 4A:
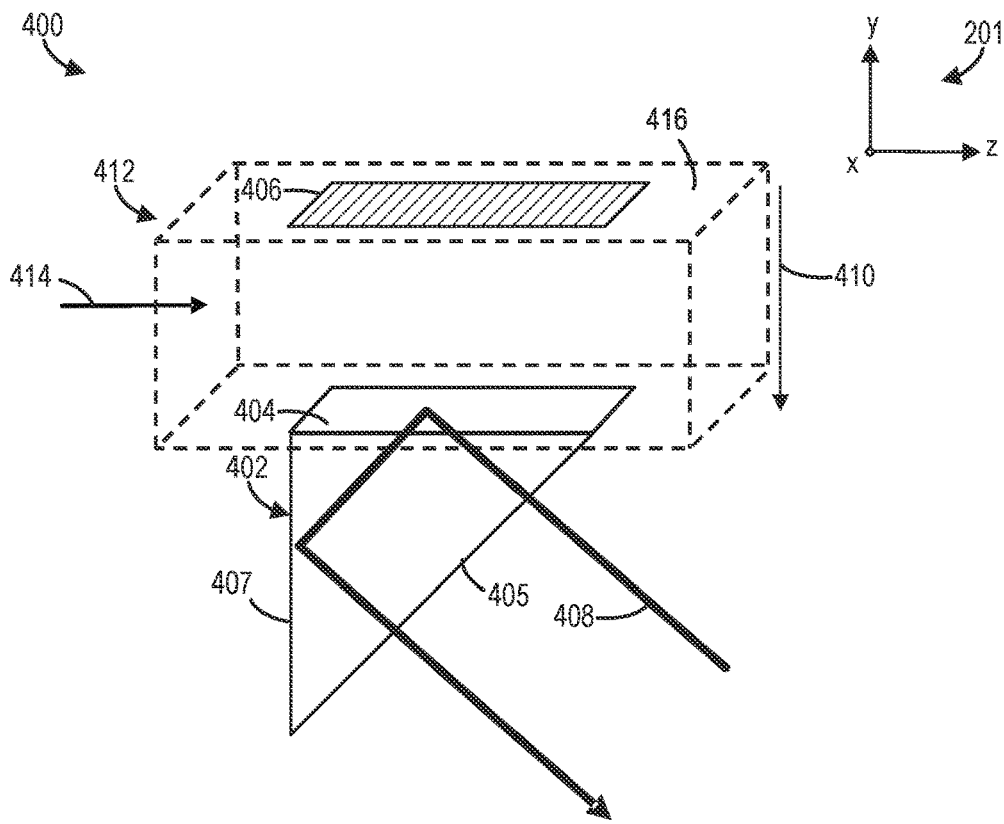
FIG. 4A shows an example of an optical PM sensor adapted with electrophoretic or thermophoretic soot attraction according to an embodiment of the disclosure.
Figure 4B:
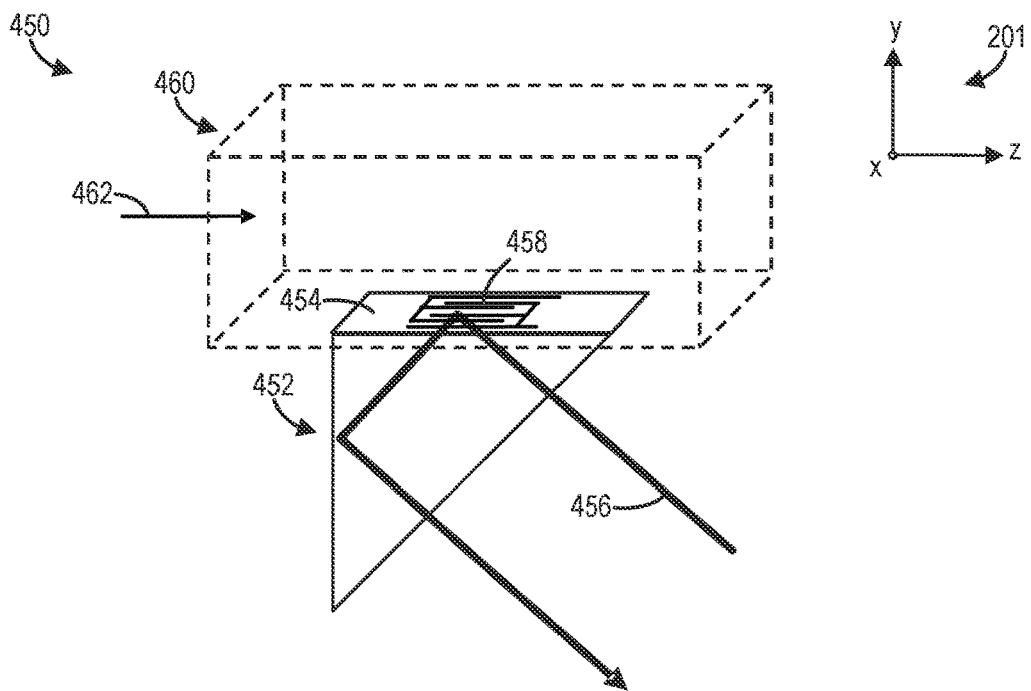
FIG. 4B shows an example of an optical PM sensor adapted with electrostatic soot attraction, according to an embodiment of the disclosure.

A speed of detection at the optical PM sensor may also be enhanced by actively attracting or driving soot to the waveguide surface to increase soot deposition at a top surface of a waveguide, rather than relying on passive soot diffusion to the waveguide surface. For example, the optical PM sensor may be adapted with an electric device which may utilize electrophoresis, thermophoresis, or electrostatic attraction to increase soot deposition. Turning now to FIGS. 4A-4B, diagrams of optical PM sensors incorporating electric devices are shown. A diagram of an optical PM sensor 400 is shown in FIG. 4A, including waveguide 402 adapted with an electric device 406, which may be a force-inducing plate 406, to drive soot particles to a top face 404 of waveguide 402, e.g., soot particles are repelled from the force-inducing plate 406. Optical PM sensor 400 shows non-limiting examples of components that may be included in an optical PM sensor for a vehicle, such as PM sensor 106 of FIG. 1. In an exemplary embodiment, waveguide 402 may be shaped as a triangular prism including three faces and two sidewalls, similar to waveguide 216 of FIG. 2A. Chamber 412, as indicated by dashed lines, may be configured similarly to chamber 306 of FIG. 3 such that a portion of exhaust flow from an exhaust manifold flows through chamber 412.

Furthermore, chamber 412 is coupled to waveguide 402 such that a bottom face of chamber 412 includes and forms top face 404 of waveguide 402.

A top face 416 of chamber 412 (i.e., a face opposite the top face 404 of waveguide 402), which may be an inner surface of the housing, may include the force-inducing plate 406. The force-inducing plate 406 may be embedded in the top face 416 of chamber 412 such that a surface of the force-inducing plate 406 may directly contact exhaust gas flowing through chamber 412. Exhaust gas may flow in a direction indicated by arrow 414. In some examples, the force-inducing plate 406 may be a resistive heater, such that when the force-inducing plate 406 is energized, a thermal gradient may form within chamber 412 along the direction of arrow 410, e.g., temperature decreases along the direction of arrow 410. The thermal gradient may repel soot particles via thermophoresis, causing soot particles to be concentrated in a region of chamber 412 proximate to top face 404 of waveguide 402.

In some examples, the force-inducing plate 406 may be a high voltage plate formed of a conductive material and top face 404 of waveguide 402 may be coated with a layer of conductive material such as a metal or doped metal oxide (e.g., tin-doped indium oxide (ITO)). The layer of conductive material may be thin enough to be transparent with respect to an evanescent wave generated when light 408 is reflected at top face 404 of waveguide 402. For example, the layer of conductive material may be a 1.6 nm thick layer of indium tin oxide (ITO). An external voltage source may be conductively coupled to the force-inducing plate 406 such that when energized, an electrical gradient along arrow 410 may be formed, e.g., an electric field strength decreases along a direction of arrow 410. The electrical gradient may repel soot particles via electrophoresis.

The thermal or electrical gradient formed along arrow 410 may force soot particles from exhaust gas flowing through chamber 412 to deposit on top face 404 of waveguide 402. In this way, an amount of soot particles deposited on top face 404 during a set length of time may be greater than an amount of soot particles deposited without the thermal or electrical gradient over the set length of time. Light 408 may enter waveguide 402 through a first face 405 adjacent to top face 404 and reflect at top face 404, as described above with respect to FIG. 2A. The evanescent wave may be formed at a region where light 408 reflects off top face 404 which may interact with soot particles deposited at top face 404. Increasing a number of soot particles concentrated at top face 404 may increase a likelihood of scattering, refraction, or absorption of the evanescent wave, e.g., interaction of the evanescent wave with soot particles, thus increasing a signal strength (i.e., decreasing the intensity) measured by the optical PM sensor 400 based on a different in intensity between light 408 entering and leaving waveguide 402, where light 408 is also reflected off a second face 407, adjacent to top face 404 and the first face 405 of waveguide 402, before exiting waveguide 402.

A diagram of an optical PM sensor 450 is illustrated in FIG. 4B, the optical PM sensor 450 including waveguide 452, which is modified to actively attract soot particles by an electric device. The optical PM sensor 450 shows non-limiting examples of components that may be included in an optical PM sensor for a vehicle, such as PM sensor 106 of FIG. 1. As described above with reference to FIG. 4A, waveguide 452 may be a triangular prism coupled to chamber 460, indicated by dashed lines, through which exhaust gas may flow along a direction indicated by arrow 462. Chamber 460 may be coupled to waveguide 452 such that top face 454 of waveguide 452 is included in and formed by a bottom face of chamber 460. An electric device 458, which may be interdigital electrodes 458 (e.g., planar interdigitated electrodes), coupled to top face 454 of waveguide 452.

Interdigital electrodes 458 may be a pair of electrodes conductively coupled to an external voltage source and formed of a conducting material capable of withstanding high temperatures and corrosive environments associated with exhaust gas. The material of interdigital electrodes 458 may be selected based on compatibility with optical measurements relying on generation of evanescent waves. For example, interdigital electrodes 458 may be formed of platinum, ITO, or silicon carbide (SiC). A flow of electric current through interdigital electrodes 458 may generate an electric field which may attract charged particulate matter from the exhaust flow in chamber 460 by an electrostatic force, causing the charged particulate matter (e.g., charged soot particles) to deposit on top face 454 of waveguide 452 and form dendrites. An electric potential applied to interdigital electrodes 458 may correspond to a separation between fingers of interdigital electrodes 458.

For example, the fingers of interdigital electrodes 458 may be separated, e.g., spaced apart, by a 45 µm gap and a 45V electrical potential may be applied, therefore generating a 1 kV/mm electric field. In other examples, interdigital electrodes 458 may be spaced apart by between 10 µm to 1000 µm and the electrical potential may therefore be applied between 10 V to 1000 V. The electrode spacing and the electrical potential may be selected such that the resulting electric field is 1 kV/mm. Thus, the electrode spacing of interdigital electrodes 458 may be configured with respect to light 456, e.g., angle of incidence, critical angle, point of total internal reflection along top face 454, etc., such that the generated evanescent wave may be attenuated by soot particles and not by interdigital electrodes 458. In this way, interdigital electrodes 458 may increase a rate at which soot particles collect at top face 454 of waveguide 452, enhancing a sensitivity and a detection speed of the optical PM sensor 450 based on interaction of soot particles with the evanescent wave generated when light 456 is reflected at top face 454 of waveguide 452, as described above with respect to FIG. 4A.

The embodiments described above and illustrated in FIGS. 4A-4B may demand a separate surface-regeneration device for removing deposited soot particles from the top face of the waveguide when the soot particles accumulate to an extent that degrades an accuracy of the optical PM sensor. For example, a heating device coupled to the top face of the waveguide may be used to heat the top face and burn off soot particles. Additionally or alternatively, the heating device may be coupled to a face of the waveguide other than the top face, such as the first face 405, the second face 407, or faces parallel with the y-z plane of waveguide 402 of FIG. 4A.

Furthermore, a photodetector included in the optical PM sensor may be positioned to receive the light reflected from the waveguide. The intensity of the reflected light may be recorded as a voltage by the photodetector. A rate at which the photodetector voltage decreases, or a duration of time for the photodetector voltage to reach a target voltage may be measured and used to diagnose degradation of a DPF.

Figure 5:
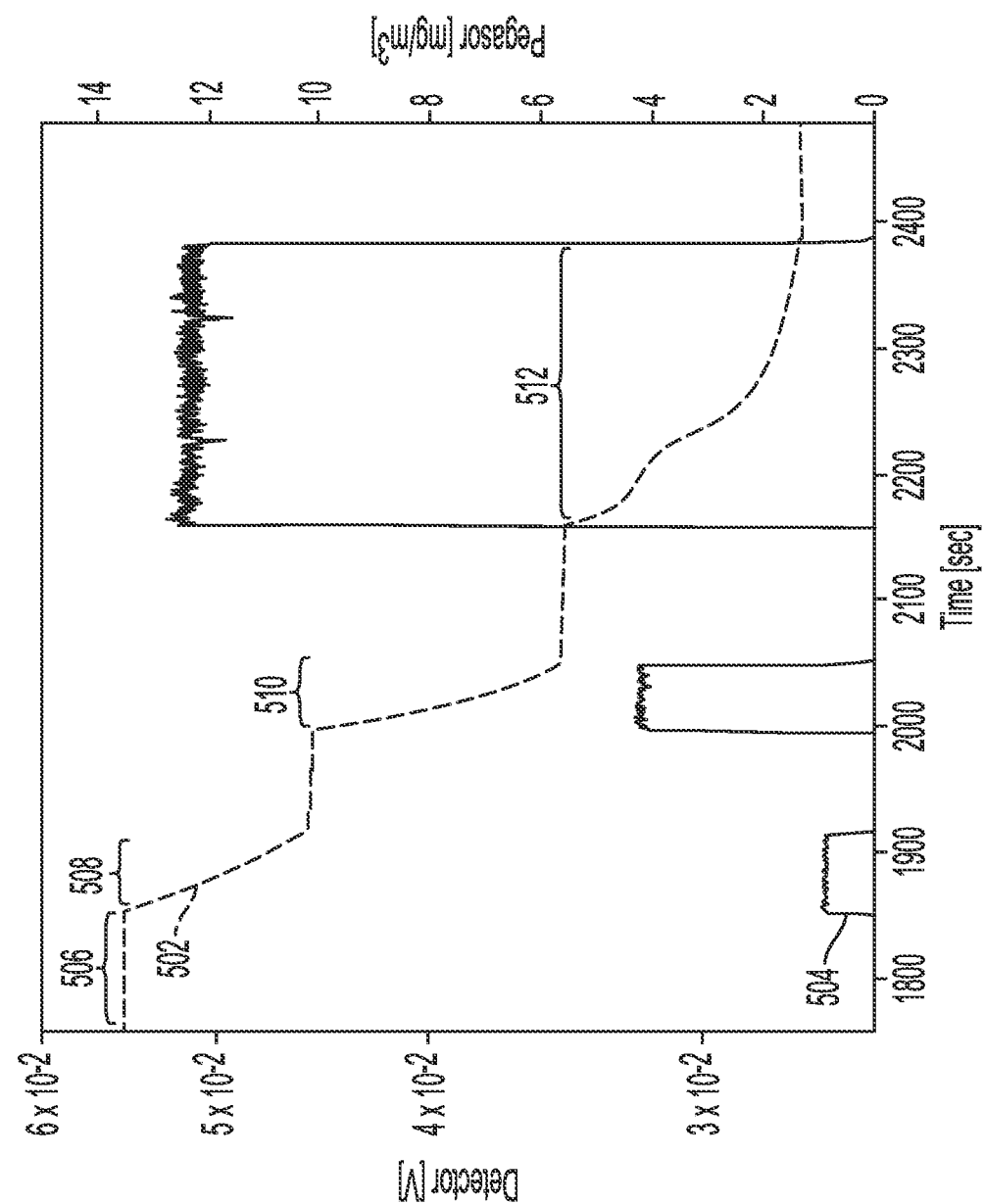
FIG. 5 shows a graph illustrating detector signal relative to time and soot concentration as a result of electrophoretic soot attraction.

FIG. 5 shows a graph 500 plotting detector voltage along a first y-axis (shown on a left side of the graph 500) and particulate matter concentration in units of mg/m$^3$ along a second y-axis (shown at a right side of the graph 500) relative to time along a common x-axis. Trace 502 shows data relative to the first y-axis while trace 504 shows data relative to the second y-axis. Detector voltage may be proportional to the intensity of light reaching a photodetector. Data corresponding to trace 502 is collected from a test optical PM sensor with a rectangular prism waveguide, as described above with respect to waveguide 302 of FIG. 3. However, unlike waveguide 302 of FIG. 2A, the test optical PM sensor does not include a reflective sidewall, e.g., the reflective sidewall 304a of FIG. 3, and light entering the waveguide at one sidewall of the waveguide is measured by a photodetector positioned to receive light at another, opposite sidewall. Data corresponding to trace 504 represents particulate matter concentration of exhaust flowing through the test optical PM sensor over a top face of the rectangular prism waveguide, the waveguide coupled to a chamber configured similarly to chamber 412 of FIG. 4A. The chamber includes a force-inducing plate to generate an electrical gradient promoting soot deposition at the top face of the rectangular prism waveguide.

At first region 506 of the graph 500, particulate matter concentration is held at zero and the corresponding voltage measured at the photodetector is constant (i.e., slope equal to zero). At second region 508 of the graph 500, particulate matter at a concentration of 1 mg/m$^3$ (as indicated by trace 504) is passed over the surface of the waveguide while being exposed to the electric field gradient generated by the force-inducing plate. Concurrently, the voltage at the detector starts to decrease at a steady rate as the soot gathering at the top surface of the waveguide absorbs or scatters light, reducing a number of photons reaching the photodetector. At third region 510 of graph 500 the particulate matter concentration increases to 4 mg/m$^3$. Concurrently, the voltage measured by the photodetector drops at a steady rate. The rate of decrease at third region 510 is faster than the rate of decrease at second region 508. As such, the rate of photodetector voltage decrease may be proportional to the concentration of particulate matter passing over the waveguide, as described with respect to FIG. 2B above. At a fourth region 512 of the graph 500, particulate matter is passed through the test optical PM sensor at a concentration of 12 mg/m$^3$. Again, the voltage decreases with the introduction of particulate matter, but not at a constant rate, which may indicate saturation of the test optical PM sensor.

The graph 500 confirms that the slope of photodetector voltage decrease is proportional to a concentration of soot passing over the waveguide surface. A response time indicated by trace 502, corresponding to a change in PM concentration shown by trace 504, demonstrates that an optical PM sensor adapted with a force-inducing plate to moderate soot deposition may enhance a response rate of the optical PM sensor such that a PM concentration of 1 mg/m$^3$ may be registered nearly instantaneously, e.g., within less than 5 seconds. Additionally, the graph 500 shows a maximum threshold concentration of soot at an optical PM sensor surface may be reached, above which the concentration of soot may no longer be measured accurately. To alleviate the excessive accumulation of soot, the optical PM sensor may also include a resistive heater to regenerate the surface of the optical PM sensor. An example of an embodiment of such an optical PM sensor is discussed below with respect to FIG. 6.

Turning now to FIG. 6, a schematic diagram of an optical PM sensor 600 (which may be an embodiment of PM sensor 106 of FIG. 1), having both a reflective waveguide surface and an active soot accumulation mechanism is shown. A chamber, such as the chambers shown in FIGS. 3-4B may be similarly coupled to a waveguide 604 of the PM sensor 600 but is omitted in FIG. 6 for clarity. The optical PM sensor 600 may be configured to measure PM concentration in the exhaust gas, and as such, may be coupled to an exhaust passage (e.g., such as the exhaust passage 35 shown in FIG. 1), upstream or downstream of a DPF (such as DPF 102 shown in FIG. 1).

Waveguide 604 may have a length 621 that is greater than a width 624 of waveguide 604 and both the length 621 and the width 624 may be greater than a height 626 of waveguide 604. In one example, the length 621 may be between 1 mm-10 mm, the width 624 may be between 10 mm-100 mm, and the height 626 may be between 0.1 mm-1 mm.

Light 620 from light source 602 may be directed to enter waveguide 604 through a first sidewall 606b of four sidewalls 606 of waveguide 604, the first sidewall 606b opposite a reflective sidewall 606a. The reflective sidewall 606a may have, for example, a mirror surface or coating. Light 620, shown as incoming light 620a and reflected light 620b, may propagate through waveguide 604 by total internal reflection, reflecting multiple times off of the top face 608 and the opposing bottom face 609 as incoming light 620a travels in a direction indicated by arrow 610, parallel to the exhaust gas flow direction indicated by arrow 614. Incoming light 620a is reflected at the reflective sidewall 606a to become reflected light 620b, which is further propagated through waveguide 604, also by total internal reflection, in a direction of arrow 612. Upon exiting waveguide 604, the light may be detected by photodetector 622. Photodetector 622 may be any detector able to convert photons of the wavelength of light emitted by light source 602 into an electrical signal. For example, photodetector 622 may be a silicon photodiode, a silicon charge coupled device (CCD), a GaP photodiode, a Ge photodiode, or an InGaAs photodiode.

Internal reflection of incoming light 620a may causes reflected light 620b to follow a path that is different and offset from a path of the incoming light 620a. Reflected light 620b therefore exits waveguide 604 at an exit point along the first sidewall 606b that is different and spaced away from an entry point of incoming light 620a. For example, a distance 650 between the exit point and the entry point may be between 1 mm-10 mm. The different paths of incoming light 620a and reflected light 620b allows light source 602 and photodetector 622 to be positioned on a same side of waveguide 604 and spaced apart from one another by a distance corresponding to the paths of incoming light 620a and reflected light 620b, respectively.

As described above with respect to FIG. 3, the reflective sidewall 606a may also be arranged as one of the four sidewalls 606 perpendicular to the gas flow direction 614. The top face 608 of waveguide 604 may be exposed to soot from the exhaust gas flow. Further, soot may be actively drawn to the top face 608 by electrophoretic or thermophoretic forces as indicated by arrow 616. For example, as described above with respect to FIGS. 4A-B, the optical PM sensor 600 may include interdigitated electrodes (not shown in FIG. 6) at the top face 608 of waveguide 604, as shown in FIG. 4B, or a force-inducing plate at the chamber coupled to waveguide 604, as shown in FIG. 4A, where the chamber may be an inner volume of a housing of the optical PM sensor 600.

The top face 608 may also include one or more resistive heating elements 618. Resistive heating elements may be formed of a conductive material transparent to light 620, such as ITO or SiC. The one or more resistive heating elements 618 may be used to remove soot from top face 608 by regeneration. For example, the one or more resistive heating elements 618 may be activated when a voltage of the photodetector reaches 50% of a value measured with zero soot present. The one or more resistive heating elements 618 may heat top face 608 past an oxidation temperature of the soot, causing the soot to oxidize to gas phases which are drawn out of the optical PM sensor 600. Additionally or alternatively, the one or more resistive heating elements 618 may be configured as interdigital electrodes, similar to interdigital electrodes 458 of FIG. 4B. In this way, when the interdigital electrodes are not being used for regeneration, a voltage may be applied to the interdigital electrodes to attract soot to top face 608 to increase soot deposition when measurements of particulate matter in exhaust gas is desired.

As described above, when waveguide 604 is adapted with reflective sidewall 606a, a path of propagating light may be increased in length. For example, the path length may be at substantially doubled. By combining the increased path length, e.g., increased reflection of propagating light and therefore increased generation of evanescent waves, with active soot attracting or repelling devices to augment soot deposition, a sensitivity of the optical PM sensor may be increased. In another example, reflection of light may be increased by adapting the optical PM sensor with a multi-pass cell, which may leverage an arrangement of mirrors around a reflective cavity to enhance the optical PM sensor sensitivity. Examples of the multi-pass cell are shown in FIGS. 7A-7B.

Turning now to FIG. 7A, a two-dimensional (2D) diagram of an optical PM sensor 700 is shown having waveguide 702 incorporated into a reflective cavity 718. The optical PM sensor 700 shows non-limiting examples of components that may be included in an optical PM sensor for a vehicle, such as PM sensor 106 of FIG. 1. Waveguide 702 may be a trapezoidal prism, e.g., having a trapezoidal geometry along the y-z plane, including a top face 704, a bottom face 705, and four sidewalls 707. Chamber 710, which may be an inner volume of a housing of the optical PM sensor 700, may be positioned directly above the reflective cavity 718. As described above with respect to FIGS. 3-4B, the top face 704 of waveguide 702 may be included in a bottom surface of chamber 710, e.g., the top face 704 of waveguide 702 is also the bottom surface of chamber 710, where exhaust flow from an exhaust manifold flows through chamber 710 in a direction indicated by arrow 706.

The reflective cavity 718 may include first reflective structure 714, or mirror 714, waveguide 702, and second reflective structure 716, or mirror 716. First mirror 714 may be a one-way mirror and each of first mirror 714 and second mirror 716 may be configured to reflect at least a portion of light 712 emitted from a pulsed light source of the optical PM sensor 700. A beam splitter may be positioned outside of the reflective cavity 718, between the pulsed light source and mirror 714, as shown in FIG. 7B and described further below. The light 712 may enter the reflective cavity 718 and waveguide 702 in a first direction that is the same direction as exhaust flow (e.g., along the positive z-axis) and leave the reflective cavity 718 and waveguide 702 along a similar path in a second, opposite direction (e.g., along the negative z-axis). The mirrors may be arranged within the reflective cavity 718 spaced away from waveguide 702 (e.g., not in contact with waveguide 702) and from one another. Furthermore, waveguide 702 is positioned between first mirror 714 and second mirror 716. The first mirror 714 may be positioned within the reflective cavity 718 proximate to a first sidewall 707a of waveguide 702 and the second mirror 716 may be positioned within reflective cavity proximate to a second sidewall 707b of waveguide 702, the second sidewall 707b opposite the first sidewall 707a. Second mirror 716 may be further away from the light source than first mirror 714.

The mirrors may be oriented perpendicular to the top face 704 and the bottom face 705 of waveguide 702, perpendicular to the z-axis (e.g., perpendicular to the direction of exhaust flow 706), and parallel with the y-x plane. In another example, however, first and second mirrors 716 and 714 may instead be positioned perpendicular to the x-axis, e.g., parallel with the y-z plane. The reflective cavity 718 may have a depth 720 similar to a height of waveguide 702 and heights of the mirrors, the heights defined along the y-axis. For example, the depth 720 of reflective cavity 718 may be between 0.1 mm-10 mm. A length 722 of the reflective cavity 718 may be selected to allow the mirrors to be spaced away from opposite sides of waveguide 702 by a target amount. For example, the mirrors may be spaced away from the respective sides of waveguide 702 by 1 mm-20 mm. Furthermore, a distance between each of the mirrors and the respective side of waveguide 702 may be similar, as shown in FIG. 7A. In other examples, however, the distances may not be similar and waveguide 702 may be positioned closer to one of the mirrors than the other, depending on an extent to which the light 712 is collimated.

Second mirror 716 may be configured to reflect 100% or close to 100% of the light 712 emitted from the pulsed light source of the optical PM sensor 700. First, e.g., one-way, mirror 714, may allow the light 712 to be entirely transmitted therethrough when travelling along the first direction (e.g., along the positive z-axis). When the light 712 returns along the second direction (e.g., along the negative z-axis) after reflection at second mirror 716, less than 100% of the light 712 is reflected from first mirror 714 to return to second mirror 716 along the first direction. At least a portion of the light 712 is transmitted through first mirror 714 and directed to a photodetector via the beam splitter, as described below, with reference to FIG. 7B. For example, first mirror 714 may reflect at least 99% of the light 712. In one example, first mirror 714 may reflect up to 99.99% of the light 712, or between 99.90% and 99.99%.

As described above, the light 712 emitted from the pulsed light source may enter the reflective cavity 718, passing through the beam splitter (not shown) and first mirror 714 along the first direction. Light 712 may be refracted at the first sidewall 707a, reflected at the top face 704, and again at the second sidewall 707b of waveguide 702. Upon leaving waveguide 702 the light 712 may strike second mirror 716 to be reflected back to waveguide 702 along the second direction. The light 712 is again refracted at the second sidewall 707b, reflected at the top face 704, and the first sidewall 707a of waveguide 702. Each time the light 712 interacts with the top face 704, the light 712 may undergo total internal reflection and generate an evanescent wave, which causes attenuation of the light 712 if soot is present at the top face 704 of waveguide 702. The light 712 strikes first mirror 714 after leaving waveguide 702 through the first sidewall 707a where most of the light 712 is reflected to return to waveguide 702 in the first direction while a remaining, non-reflected portion passes through first mirror 714 and is directed to the photodetector by the beam splitter. For example, if one-way mirror is coated to be 99% reflective, 99% of the light 712 may be directed back to waveguide 702 and the remaining 1% may exit the reflective cavity 718. In this way, a light pulse may be reflected a plurality of times between mirrors 714 and 716, allowing the light 712 to be reflected at the top face 704 of waveguide 702, where soot is deposited, a corresponding number of times. A sensitivity of the optical PM sensor 700 may be increased with each reflection of light 712 off of top face 704. An intensity of a signal received at the photodetector may decrease over time and a decay time may decrease with increased soot deposition. An arrangement of a pulse light source and a photodetector relative to the reflective cavity 718 is shown in FIG. 7B.

FIG. 7B shows an alternate view of the optical PM sensor 700 of FIG. 7A, including relative positions of a pulsed light source 754, a beam splitter 756, and a photodetector 762. The pulsed light source 754 is aligned with the beam splitter 756 and first mirror 714 along a path of the light 712 between the pulsed light source 754 and waveguide 702. The photodetector 762, however, is not arranged along the path of the light 712 between the pulsed light source 754 and waveguide 702, and is instead offset from the path of the light 712. For example, the photodetector 762 may be aligned with the beam splitter 756 perpendicular to the path of the light 712. Other locations of the photodetector 762 relative to the beam splitter 756 are possible, however.

The beam splitter 756 is positioned between the pulsed light source 754 and first mirror 714 along a path of the light 712. In one example, the beam splitter 756 may be a cube formed of two triangular prisms with adhesive applied at an interface of the two triangular prisms. The beam splitter 756 may be any type of device able to split a beam of light into at least two beams travelling at different angles relative to the beam splitter, however.

In some examples, the optical PM sensor 700 may be configured to actively attract soot to the top face 704 of waveguide 702, as described in detail with respect to FIGS. 4A-B, by incorporation of interdigitated electrodes at the top face 704 or a force-inducing plate arranged in chamber 710 (as shown in FIG. 7A) to generate an electrophoretic or thermophoretic gradient in a direction indicated by arrow 768. The top face 704 of waveguide 702 may include one more resistance heaters 766 which may be used to intermittently regenerate the top face 704 of waveguide 702 as described above with respect to FIG. 6.

The pulsed light source 754 may be a continuous light source coupled to a physical shutter configured to open and close to deliver light over a discrete time period. For example, pulsed light source 754 may be a laser diode passed through an acousto-optic modulator, an electrically switched laser diode, or an electrically switched LED.

As described above with respect to FIG. 7A, first mirror 714 may reflect less than 100% of the light 712 and a portion of the light 712 is instead transmitted through first mirror 714, e.g., a transmitted portion of light, along the second direction and received at the beam splitter 756. The beam splitter 756 may be set at an angle with respect to waveguide 702 such that a portion of the transmitted portion of the light 712 is directed to photodetector 762 (e.g., a refracted portion) while a remaining portion of the transmitted portion of the light 712 is reflected back to the reflective cavity 718 along the first direction. In one example, the beam splitter 756 may be configured to direct the refracted portion of light at an angle $\varphi$ relative to the z-axis along the x-z plane. For example, when the beam splitter 756 is formed of the two triangular prisms, the interface of the two triangular prisms may be arranged at a 45° angle relative to the z-axis along the x-z plane, causing the refracted portion to travel perpendicular to the z-axis, e.g., angle $\varphi$ is 90°. Other possible configurations and arrangements of beam splitter 756 and the photodetector 762 have been considered, however. For example, angle $\varphi$ may vary according to the positioning of the photodetector 762 relative to the beam splitter 756.

In another example, the beam splitter 756 may instead be an angled mirror. The angled mirror may be oriented such that the transmitted portion of the light 712 is entirely reflected by the beam splitter 756 and directed to the photodetector 762. Selection of the beam splitter 756 versus the angled mirror may depend on characteristics of the optical PM sensor components, such as a transmissibility of first mirror 714, a sensitivity of the photodetector 762, etc.

As yet another example, the optical PM sensor 700 may instead include only first mirror 714 to reduce a complexity and number of components of the optical PM sensor 700, and the beam splitter 756 may be omitted. In such an instance, first mirror 714 may be angled relative to the z-axis, along the x-z plane. First mirror 714 may similarly allow the light 712 from the pulsed light source 754 to completely pass through the first mirror 714 along the first direction to be transmitted through waveguide 702, reflected by second mirror 716, and returned to first mirror 714. Upon returning to first mirror 714, the light 712 is reflected from first mirror 714 to the photodetector 762. As such, an angle of first mirror 714 may correspond to the position of the photodetector 762 relative to first mirror 714. Compared to when both the beam splitter 756 and first mirror 714 are implemented, as described above, use of only first mirror 714 results in two passes of the light 712 through waveguide 702, rather than numerous times. A sensitivity of the optical PM sensor 700 is therefore lower when only first mirror 714 is used.

The photodetector 762 may be any photodetector able to convert photons the light 712 into an electrical signal within a required time resolution. For example, the photodetector 762 may be a silicon photodiode or CCD, or a photodiode with a different type of semiconductor, as discussed above with respect to FIG. 6. The photodetector 762 may generate an intensity profile of the pulsed, refracted portion of the light 712 over time (i.e., a decay curve) which may correspond to the concentration of soot at the top face 704 of waveguide 702. An example of decay curves generated based on the optical PM sensor 700 are shown in FIG. 8. The decay curves may be used to estimate soot concentration in exhaust gas downstream of a DPF.

FIG. 8 shows graph 800 plotting light intensity along the y-axis as a function of time along the x-axis. Traces 802, 804, and 806 represent examples of decay curves obtained from the optical PM sensor 700 of FIGS. 7A-7B. Trace 802 represents a shape of a pulse of light that enters the reflective cavity of the optical PM sensor. Traces 804 and 806 are decay curves collected by the photodetector, after the pulse of light is directed to the reflective cavity and both refracted and reflected by the waveguide and mirrors. Trace 804 shows a decay curve corresponding to deposition of a first concentration of soot at a top face of the waveguide. Trace 806 shows a decay curve corresponding to deposition of a second concentration of soot at the top face of the waveguide that is greater than the first concentration of soot.

Traces 806 and 804 depict constant, initial intensities over an initial time period corresponding to a duration of the light pulse as indicated by trace 802. An intensity of trace 804 is greater than trace 806 during emission of the light pulse. At a first time point t1 on the x-axis, corresponding to an end of the light pulse, the intensities of traces 802 and 804 each decrease exponentially. A duration between the first time point t1 and when the intensities shown by traces 804 and 806 decrease to $1/e^2$ of their respective initial intensities are denoted by t3 and t2, respectively, and may be correlated to the concentration of soot at a top face of waveguide. For example, trace 806 decreases to $1/e^2$ of its peak intensity at t2, where a duration of time between the first time point t1 and the second time point t2 is $t_M$. Trace 804 decreases to $1/e^2$ of its peak intensity at third time point t3 on the x-axis, where a duration of time between the first time point t1 and the third time point t3 is $t_L$. As shown in graph 800, $t_L$ is greater than $t_M$. A rate of change in time of the measured decay times, e.g., $d(t_L/t_M)$ or $d(t_M/t_L)$ may correspond to soot concentration in the exhaust gas.

The results depicted in graph 800 demonstrates how decay curves of pulsed light may be measured over time using the optical PM sensor 700 of FIGS. 7A-B. The measured decay curve may be obtained from light that has been attenuated based on interaction of evanescent waves with soot at the surface of the waveguide a number of times, allowing small differences in the decay curves to detect changes in soot concentration which may increase the sensitivity of the optical PM sensor relative to the optical PM sensors shown in FIGS. 3-4B and 6.

In comparison to the optical PM sensor 600 of FIG. 6, the optical PM sensor 700 of FIGS. 7A-7B may be more complex and include more components. However, a sensitivity of the optical PM sensor 700 may be greater than that of the optical PM sensor 600. For example, the reflective cavity of the optical PM sensor 700 may allow smaller changes in particulate matter concentration in exhaust gas to be detected faster. As such, the optical PM sensor 600, or similar configurations, may be desirable if low cost and ease of installation is preferred over higher sensitivity, while the optical PM sensor 700, or similar configurations, may be selected when high sensitivity and fast response times are demanded.

Figure 9:
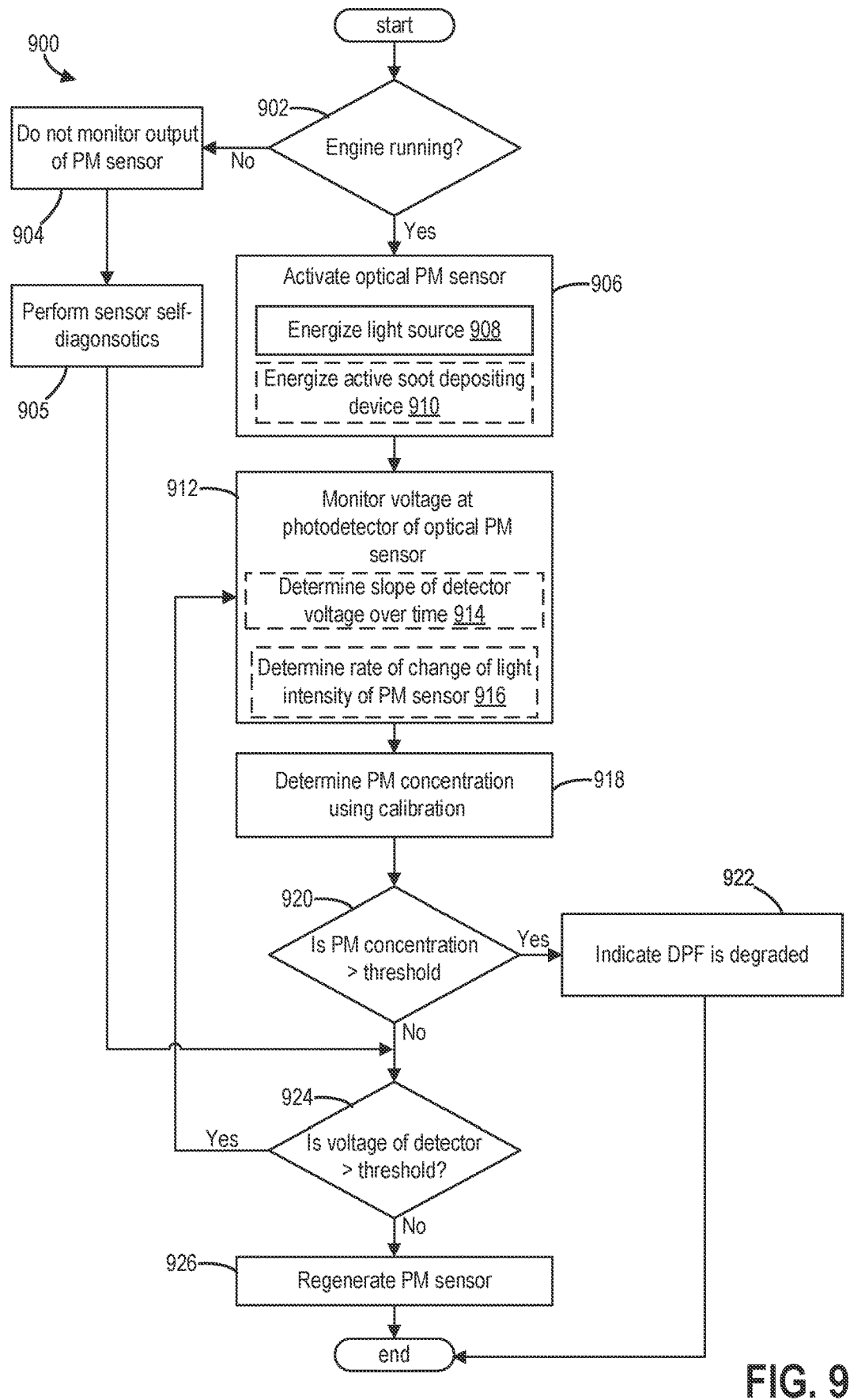
FIG. 9 shows a flowchart of an example method for operating an optical PM sensor.

Turning now to FIG. 9, an example of a method 900 is shown for operating an optical PM sensor to monitor a condition of a DPF of a vehicle system, such as the vehicle system 6 of FIG. 1. The vehicle system may include an engine coupled to an exhaust system through which exhaust gas, including particulate matter such as soot, may flow before being released to the atmosphere. The optical PM sensor may be any of the optical PM sensors of FIG. 6 or 7B, configured to enhance a sensitivity of the sensor by implementing one or more of increasing soot deposition at a waveguide of the optical PM sensor and increasing reflection of light off of an upper surface of the waveguide, where the soot deposition occurs. Instructions for carrying out method 900 may be executed by a controller, such as the controller 12 of FIG. 1, based on instructions stored on a memory of the controller and in conjunction with signals received from sensors of the engine system, such as the sensors described above with reference to FIG. 1. The controller may employ engine actuators of the engine system to adjust engine operation, according to the method described below.

At 902, the method includes confirming if the engine is running. If the engine is not running, the method proceeds to 904 and an output, e.g., a soot concentration measurement, of the optical PM sensor is not obtained and the method proceeds to 905 to perform sensor self-diagnostics. For example, the controller may activate the optical PM sensor, when the engine is confirmed to be off, and command operation of the optical PM sensor in a self-diagnostic mode. The sensor self-diagnostics may include, for example, activating one or more resistance heaters, such as the one or more resistive heating elements 618 of FIG. 6, to remove water from the optical PM sensor surface. In another example, the sensor self-diagnostics may include checking for the baseline light intensity while exhaust gas is not flowing through the optical PM sensor. The baseline light intensity may be used to confirm a condition of a light source of the optical PM sensor and correct for attenuation due to contamination. As another example, the sensor self-diagnostics may include checking a condition or integrity of the resistive heater without heat loss due to exhaust flow across the sensor. Furthermore, operation of the optical PM sensor in the self-diagnostic mode may allow accumulation of soot at the upper surface of the waveguide during a prior drive cycle to be assessed. For example, while the sensor is not actively monitoring soot deposition but electrical power is available and the controller is active (e.g., awake), self-diagnostics of the sensor may include determining whether a regeneration event of sensor occurred prior to termination of the previous drive cycle and whether soot is present at the upper surface of the waveguide above a threshold amount, the threshold amount indicative of the soot accumulation being within a margin of saturation at the upper surface. The controller may command regeneration of the upper surface by energizing the resistive heater to burn off the accumulated soot if the soot accumulation from the previous drive cycle reached the threshold amount.

As such, the method continues to 924, as described further below, to determine if regeneration of the upper surface of the waveguide is demanded. If the engine is running, the method proceeds to 906 to activate the optical PM sensor. Activating the optical PM sensor may include energizing a light source of the optical PM sensor at 908, configured to emit light incident to the waveguide. The light source may be a continuous light source, as described with respect to FIG. 3-6, or a pulsed light source, as described with respect to FIGS. 7A-7B. Furthermore, activating the optical PM sensor may optionally include energizing a device, e.g., a soot-depositing device, for increasing soot deposition at 910. The soot-depositing device may be a force-inducing plate or interdigitated electrodes, as described previously with reference to FIGS. 4A-4B.

At 912, an output of a photodetector of the optical PM is monitored. For example, the output may be voltage which may be proportional to the intensity of light at the light detector. The method of monitoring light intensity may depend on the type of optical PM sensor being used. If the optical PM sensor includes a continuous light source as described above with respect to FIGS. 3A-6, then, at 914, the method may include monitoring a change in voltage measured at a photodetector over time to determine a slope of detector voltage over time. Determining the slope of the detector voltage may include determining a time required to reach a target change in voltage at the photodetector. The slope may be estimated over a time period between 10 s-60 s, for example and determined between one to ten times. If the slope is determined more than one time, the slopes may be averaged to improve accuracy. In some instances, the slope may vary over time due to outside noise factors or variations in the amount of soot emitted by the engine. The optical PM sensor may be calibrated with respect to the noise factors or a sensor operation model may be implemented at the controller, e.g., when the controller is an electronic control unit (ECU), to correct the noise factors.

Alternatively, the optical PM sensor may be used in an intensity-threshold manner. For example, light intensity levels may be defined, between which time is measured. If an amount of time for the light to intensity to vary according to the defined levels is equal to or exceeds a pre-calibrated time, the amount of soot may be too low to measure reliably. If the time is less than the pre-calibrated time, the time is compared to a calibrated look-up table showing a relationship between time and cumulative exhaust flow to determine an emission rate of soot (e.g., in mg). The emission rate may then be normalized based on miles driven to allow the rate to be compared directly with regulatory requirements for emissions.

If the optical PM sensor includes a reflective cavity and a pulsed light source as described above with respect to FIG. 7A-B, then, at 916, the method may include determining a decay rate of light intensity detected at the photodetector. For example, the method may include monitoring an exponential light decay measured at the photodetector and determining an elapsed time to reach a preset value such as $1/e^2$ of a peak light intensity.

At 918, the value obtained at 912 is compared to an empirically determined calibration curve and used to infer a PM concentration from the optical PM sensor output. At 920, the PM concentration may be compared to a pre-set threshold PM concentration. The threshold PM concentration may be a value above which the DPF is deemed degraded and/or leaking. For example, the threshold PM concentration may be set relative to environmental regulations. For example, the threshold PM concentration may be a concentration equivalent to 10 mg/mile. If the PM concentration is greater than the threshold, then the DPF may be degraded and/or leaking, which may be indicated to an operator at 922. For example, a malfunction indicator lamp (MIL) may be activated, or a notification may be provided at a human-machine interface (HMI) of the vehicle system (if present). The method ends. If the PM concentration is equal to or less than the threshold, then method 900 proceeds to 924.

At 924, a photodetector voltage measured at 912 may be compared to a threshold voltage. The threshold voltage may be a value at which the voltage is less than 50% of a reference voltage, e.g., a voltage corresponding to when no soot is present, as described above with respect to FIG. 6. If the voltage measured at the photodetector of the optical PM sensor is greater than the threshold voltage, the method returns to 912 to continue to monitor the voltage at the photodetector of the optical PM sensor. If the voltage measured at the photodetector of the optical PM sensor is less than or equal to the threshold voltage, the surface of the optical PM sensor is deemed oversaturated with soot and regenerated at 926. The surface may be regenerated using one or more resistive heating elements, as described above with reference to FIGS. 6 and 7B, after which method 900 ends.

Additional alternate embodiments of an optical PM sensor are shown in FIGS. 10-13. The embodiments may also leverage interaction between light and particulate matter but may not rely on components in addition to or in place of a prismatic waveguide and/or reflective cavity as described above with respect to FIG. 2A-B and 6-7B. FIG. 10 shows a first alternate example of an optical PM sensor 1000 that operates based on quenching of photoluminescence.

The optical PM sensor 1000 has a cylindrical window 1002, including a top face 1010 which may be positioned such that top face 1010 is exposed to exhaust flow. While the window 1002 may be cylindrical as shown in FIG. 10, other window shapes have been considered and may be used similarly. Window 1002 may be formed of any material that is resistant to the high heat of exhaust emissions and transparent to a wavelength of light 1004. For example, window 1002 may be formed of quartz, sapphire, or silicon carbide. The top face 1010 may be coated with a photoluminescent doped oxide film 1006. Light 1004 may be directed to the photoluminescent doped oxide film 1006 through a bottom face 1012 of window 1002, the bottom face 1012 opposite the top face 1010. The light 1004 may excite luminophores of the photoluminescent doped oxide film 1006 resulting in emission of light (not shown) at a longer wavelength (i.e., lower energy) than that of the light 1004. The emitted light may be detected by a photodetector (not shown) fitted with a chromatic filter configured to block the light 1004, but transmit the lower energy emitted light. The photoluminescent doped oxide film 1006 may collect soot particles 1008 as exhaust is passed over the top face 1010 of the window 1002. Soot particles 1008 may absorb energy from the excited photoluminescent doped oxide film 1006 without emitting a photon, resulting in a decrease in measured light intensity at the photodetector. As such, a decrease in intensity of photoluminescence measured at the photodetector may be proportional to the concentration of soot collected at the top face 1010 of the window 1002.

FIG. 11 shows a second alternate example of an optical PM sensor 1100 which utilizes fiber optics. A fiber optic cable 1110 of the optical PM sensor 1100 may include a fiber core 1106 with portions covered by a fiber cladding 1104. A bare portion of the fiber core 1106, e.g., a portion not covered by the fiber cladding 1104, may be bent such that the fiber optic cable 1110 has a D shape. The fiber optic cable 1110 may be positioned inside a venturi-style housing to draw exhaust flow over the bare portion of the fiber core 1106, allowing soot to be deposited at a surface of the fiber core 1106 along the bare portion.

Light 1103 from a light source (not shown) may be directed to enter a first end 1112 of the fiber optic cable 1110, as indicate by arrow 1102. The light 1103 may propagate through the fiber optic 1110 by total internal reflection, generating evanescent waves at each reflection of the surface of the fiber core 1106, which may interact with soot particles at the surface of the bare portion of the fiber core 1106. The curvature of the bare portion of the fiber core 1106 may extend a penetration depth of the evanescent waves, thereby increasing sensitivity of the optical PM sensor 1100. The light 1103 exiting fiber optic cable 1110 through a second end 1114 of the fiber optic cable 1110, as indicated by arrow 1108, may be received at a photodetector (not shown). The light source and photodetector may be similar to those described above. A rate of light intensity decrease of the light 1103 exiting fiber optic cable 1110 may be proportional to a concentration of soot deposited on the bare portion of the fiber core 1106.

FIG. 12 shows a third alternative example of an optical sensor 1200 adapted with an engineered coating. A waveguide 1202 may be shaped as a triangular prism including a top face 1204. The top face 1204 may be positioned so as to be exposed to exhaust gas which may deposit soot particles thereon. The top face 1204 may include a coating with a refractive index (i.e. $n_2$ of FIG. 2B) that, when soot deposits onto the top face, conditions for total internal reflection are no longer met and at least a portion of the light 1208, as indicated by arrow 1206, may be transmitted or refracted instead of reflected. As a result, the portion of the light 1208 that is not reflected may escape into the exhaust gas, thereby decreasing an amount (e.g., intensity) of light received at a photodetector relative to an amount of light emitted from a light source. A decrease in light intensity over time may be proportional to the concentration of soot deposited at the top face 1204.

In this way, an optical PM sensor may be used to determine PM concentration in an exhaust flow, downstream of a DPF. The optical PM sensor may include one or more mechanisms for increasing sensitivity of the optical PM sensor. Sensitivity may be increased by increasing the number of times light reflects off of a waveguide surface, generating an evanescent wave at each reflection which may attenuate the light, which may be achieved either by adding a reflective end to the waveguide or by incorporating the waveguide into a reflective cavity. Additionally or alternatively, sensitivity may be increased by incorporating elements generating electrophoretic or thermophoretic forces, actively driving soot particles to the sensor surface. The technical effect of increasing light and surface interactions and actively driving soot to the optical PM sensor is to boost sensitivity and response rate of an optical PM sensor. The optical PM sensor may detect at a lower concentration than a resistive PM sensor.

FIGS. 1-4B, 6-7B, and 10-12 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space there-between and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example. The drawings are shown approximately to scale, although other relative dimensions may be used.

The disclosure also provides support for a particulate matter sensor, comprising: a light source, a waveguide aligned with the light source to receive incident light from the light source and reflect the incident light off a first reflective surface of the waveguide more than one time to generate a plurality of evanescent waves, and a photodetector positioned to receive the incident light from the waveguide. In a first example of the system, the waveguide is formed of a material transparent to a wavelength of the incident light with an index of refraction greater than an index of refraction of air and wherein the incident light is reflected from the first reflective surface of the waveguide when the incident light strikes the first reflective surface at an angle greater than a critical angle. In a second example of the system, optionally including the first example, the waveguide has one of a triangular prismatic, rectangular prismatic, or trapezoidal prismatic geometry. In a third example of the system, optionally including one or both of the first and second examples, the first reflective surface is an inner face of a top surface of the waveguide, and wherein particulate matter from exhaust gas is deposited at an outer face of the top surface of the waveguide. In a fourth example of the system, optionally including one or more or each of the first through third examples, the system further comprises: an electric device arranged above the waveguide, the electric device configured to exert a force on the particulate matter and increase deposition of the particulate matter at the outer face of the top surface of the waveguide. In a fifth example of the system, optionally including one or more or each of the first through fourth examples, the waveguide receives the incident light from the light source at a first side of the waveguide, the first side adjacent to the first reflective surface, and wherein the waveguide includes a second reflective surface at a second side of the waveguide, the second side opposite of the first side and having a mirror surface. In a sixth example of the system, optionally including one or more or each of the first through fifth examples, the photodetector is positioned on a same side of the waveguide as the light source. In a seventh example of the system, optionally including one or more or each of the first through sixth examples, a first mirror is positioned between the light source and the waveguide and a beam splitter is positioned between the light source and the first mirror and the incident light is transmitted through both the beam splitter and the first mirror along a first direction of the incident light and received at a first side of the waveguide, the first side adjacent to the first reflective surface of the waveguide. In a eighth example of the system, optionally including one or more or each of the first through seventh examples, the incident light is reflected at a second mirror aligned with and spaced away from a second side of the waveguide, the second side opposite of the first side, and travels along a second direction through the waveguide, opposite of the first direction, after reflection at the second mirror, and wherein a first portion of the incident light, after reflection at the second mirror, is transmitted through the first mirror along the first direction and a second portion of the incident light is reflected by the first mirror to return to the waveguide along the second direction. In a ninth example of the system, optionally including one or more or each of the first through eighth examples, the first portion of the incident light is split into a refracted portion and a reflected portion at the beam splitter, the reflected portion returning to the waveguide along the first direction and the refracted portion directed to the photodetector, and wherein the photodetector is positioned at an angle relative to a path of the incident light between the beam splitter and the waveguide and offset from the path of the incident light. In a tenth example of the system, optionally including one or more or each of the first through ninth examples, the system further comprises: a chamber coupled to the first reflective surface of the waveguide and configured to receive exhaust gas from an engine of a vehicle, and wherein a floor of the chamber includes the first reflective surface of the waveguide.

The disclosure also provides support for a method for operating an optical particulate matter sensor to diagnose a status of a diesel particulate filter, comprising: directing a beam of light from a light source to a waveguide of the optical particulate matter sensor, and reflecting the beam of light at a first face of a first reflecting surface, the first reflecting surface included in the waveguide and having a second face for receiving particulate matter in exhaust gas, the second face opposite of the first face, energizing an electric device to increase deposition of the particulate matter at the second face of the first reflecting surface, and receiving the beam of light at a photodetector, after reflection of the beam of light at a second reflecting surface, to determine a concentration of the particulate matter in the exhaust gas based on attenuation of the beam of light, wherein the beam of light is attenuated by generation of an evanescent wave when the beam of light is reflected at the first reflecting surface. In a first example of the method, directing the beam of light from the light source to the waveguide includes one of emitting the beam of light continuously from the light source to a first refracting surface of the waveguide, the first refracting surface adjacent to the first reflecting surface and wherein receiving the beam of light at the photodetector, after reflection of the beam of light at the second reflecting surface, includes receiving the beam of light after the beam of light is reflected at a side of the waveguide configured with a reflective coating, the side of the waveguide opposite of the first refracting surface and adjacent to the first reflecting surface. In a second example of the method, optionally including the first example, determining the concentration of the particulate matter in the exhaust gas based on attenuation of the beam of light includes determining a change in voltage at the photodetector with time to estimate a slope of the change and comparing the slope to a calibration curve to infer the concentration of the particulate matter. In a third example of the method, optionally including one or both of the first and second examples, directing the beam of light from the light source to the waveguide includes emitting the beam of light in pulses from the light source, through a first mirror, to a first refracting surface of the waveguide, the first refracting surface adjacent to the first reflecting surface, and wherein receiving the beam of light at the photodetector, after reflection of the beam of light at the second reflecting surface, includes receiving the beam of light after the beam of light is reflected at a second mirror positioned at an opposite side of the waveguide from the first mirror, transmitted through the first mirror, and refracted from a beam splitter. In a fourth example of the method, optionally including one or more or each of the first through third examples, determining the concentration of the particulate matter in the exhaust gas based on attenuation of the beam of light includes monitoring exponential decay of the beam of light at the photodetector until an intensity of the beam of light decays to $1/e^2$ of an initial intensity of the beam of light.

The disclosure also provides support for an optical particulate matter sensor for a vehicle, comprising: a light-directing portion coupled to an exhaust gas-receiving portion of the optical particulate matter sensor, the light-directing portion including, a first reflecting surface configured to generate an evanescent wave, the first reflecting surface positioned at a top of the light-directing portion and at a bottom of the exhaust gas-receiving portion, a second reflecting surface positioned to increase a number of reflections of incident light at the first reflecting surface, and an electric device configured to increase deposition of particulate matter from the exhaust gas-receiving portion to the light-directing portion. In a first example of the system, the electric device is a plate coupled to a top of the exhaust gas-receiving portion of the optical particulate matter sensor, opposite of the first reflecting surface, and configured to generate one of an electric field or a thermal gradient in the exhaust gas-receiving portion when energized to drive the particulate matter to the first reflecting surface by electrophoresis or thermophoresis, respectively. In a second example of the system, optionally including the first example, the electric device is formed of interdigitated electrodes coupled to the first reflecting surface, and wherein, when energized, the interdigitated electrodes attract the particulate matter by electrostatic force. In a third example of the system, optionally including one or both of the first and second examples, the system further comprises: one or more resistive heaters coupled to the first reflecting surface to regenerate the first reflecting surface by heat.

In another representation, a particulate matter sensor includes a waveguide configured to receive incident light and reflect the incident light at a top surface of the waveguide more than one time to generate an evanescent wave at the top surface with each reflection at the top surface, the evanescent wave interacting with particulate matter in exhaust gas and causing the incident light to be attenuated.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations, and/or functions may be repeatedly performed depending on the particular strategy being used. Further, the described actions, operations, and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. Moreover, unless explicitly stated to the contrary, the terms "first," "second," "third," and the like are not intended to denote any order, position, quantity, or importance, but rather are used merely as labels to distinguish one element from another. The subject matter of the present disclosure includes all novel and non-obvious combinations and sub-combinations of the various systems and configurations, and other features, functions, and/or properties disclosed herein.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for operating an optical particulate matter sensor to diagnose a status of a diesel particulate filter, comprising:
   directing a beam of light from a light source to a waveguide of the optical particulate matter sensor, and reflecting the beam of light at a first face of a first reflecting surface, the first reflecting surface included in the waveguide and having a second face for receiving particulate matter in exhaust gas, the second face opposite of the first face;
   energizing an electric device to increase deposition of the particulate matter at the second face of the first reflecting surface; and
   receiving the beam of light at a photodetector, after reflection of the beam of light at a second reflecting surface, to determine a concentration of the particulate matter in the exhaust gas based on attenuation of the beam of light;
   wherein the beam of light is attenuated by generation of an evanescent wave when the beam of light is reflected at the first reflecting surface, wherein directing the beam of light from the light source to the waveguide includes emitting the beam of light continuously from the light source to a first refracting surface of the waveguide, the first refracting surface adjacent to the first reflecting surface, wherein receiving the beam of light at the photodetector, after reflection of the beam of light at the second reflecting surface, includes receiving the beam of light after the beam of light is reflected at a side of the waveguide configured with a reflective coating, the side of the waveguide opposite of the first refracting surface and adjacent to the first reflecting surface, and wherein determining the concentration of the particulate matter in the exhaust gas based on attenuation of the beam of light includes determining a change in voltage at the photodetector with time to estimate a slope of the change and comparing the slope to a calibration curve to infer the concentration of the particulate matter.

2. The method for operating the optical particulate matter sensor of claim 1, wherein the beam of light is received as incident light at the waveguide, wherein the waveguide is formed of a material transparent to a wavelength of the incident light with an index of refraction greater than an index of refraction of air, and wherein the incident light is reflected from the first reflecting surface of the waveguide when the incident light strikes the first reflecting surface at an angle greater than a critical angle.

3. The method for operating the optical particulate matter sensor of claim 1, wherein the waveguide has one of a triangular prismatic, rectangular prismatic, or trapezoidal prismatic geometry.

4. The method for operating the optical particulate matter sensor of claim 1, wherein the photodetector is positioned on a same side of the waveguide as the light source.

5. The method for operating the optical particulate matter sensor of claim 1, wherein the beam of light is received as incident light at the waveguide, and wherein a first mirror is positioned between the light source and the waveguide and a beam splitter is positioned between the light source and the first mirror and the incident light is transmitted through both the beam splitter and the first mirror along a first direction of the incident light and received at a first side of the waveguide, the first side adjacent to the first reflecting surface of the waveguide.

6. The method for operating the optical particulate matter sensor of claim 5, wherein the beam of light is received as incident light at the waveguide, wherein the incident light is reflected at a second mirror aligned with and spaced away from a second side of the waveguide, the second side opposite of the first side, and travels along a second direction through the waveguide, opposite of the first direction, after reflection at the second mirror, and wherein a first portion of the incident light, after reflection at the second mirror, is transmitted through the first mirror along the first direction and a second portion of the incident light is reflected by the first mirror to return to the waveguide along the second direction.

7. The method for operating the optical particulate matter sensor of claim 6, wherein the first portion of the incident light is split into a refracted portion and a reflected portion at the beam splitter, the reflected portion returning to the waveguide along the first direction and the refracted portion directed to the photodetector, and wherein the photodetector is positioned at an angle relative to a path of the incident light between the beam splitter and the waveguide and offset from the path of the incident light.

8. The method for operating the optical particulate matter sensor of claim 1, further comprising a chamber coupled to the first reflecting surface of the waveguide and configured to receive exhaust gas from an engine of a vehicle, wherein a floor of the chamber includes the first reflecting surface of the waveguide.

9. The method for operating the optical particulate matter sensor of claim 1, wherein the electric device is a plate coupled opposite of the first reflecting surface, and wherein the waveguide has a triangular prismatic geometry.

10. The method for operating the optical particulate matter sensor of claim 1, further comprising one or more resistive heaters coupled to the first reflecting surface to regenerate the first reflecting surface by heat.

11. A method for operating an optical particulate matter sensor to diagnose a status of a diesel particulate filter, comprising:
  directing a beam of light from a light source to a waveguide of the optical particulate matter sensor, and reflecting the beam of light at a first face of a first reflecting surface, the first reflecting surface included in the waveguide and having a second face for receiving particulate matter in exhaust gas, the second face opposite of the first face;
  energizing an electric device to increase deposition of the particulate matter at the second face of the first reflecting surface; and
  receiving the beam of light at a photodetector, after reflection of the beam of light at a second reflecting surface, to determine a concentration of the particulate matter in the exhaust gas based on attenuation of the beam of light;
  wherein the beam of light is attenuated by generation of an evanescent wave when the beam of light is reflected at the first reflecting surface, wherein directing the beam of light from the light source to the waveguide includes emitting the beam of light in pulses from the light source, through a first mirror, to a first refracting surface of the waveguide, the first refracting surface adjacent to the first reflecting surface, wherein receiving the beam of light at the photodetector, after reflection of the beam of light at the second reflecting surface, includes receiving the beam of light after the beam of light is reflected at a second mirror positioned at an opposite side of the waveguide from the first mirror, transmitted through the first mirror, and refracted from a beam splitter, and wherein determining the concentration of the particulate matter in the exhaust gas based on attenuation of the beam of light includes monitoring exponential decay of the beam of light at the photodetector until an intensity of the beam of light decays to $1/e^2$ of an initial intensity of the beam of light.

\* \* \* \* \*